United States Patent [19]
Bohen et al.

[11] Patent Number: 5,328,627
[45] Date of Patent: Jul. 12, 1994

[54] FIRE RESISTANT HYDRAULIC FLUIDS

[75] Inventors: Joseph M. Bohen, King of Prussia; Paul Tubbs, Philadelphia, both of Pa.

[73] Assignee: Elf Atochem North America, Inc., Philadelphia, Pa.

[21] Appl. No.: 508,744

[22] Filed: Apr. 12, 1990

Related U.S. Application Data

[63] Continuation-in-part of Ser. No. 258,267, Oct. 14, 1988, abandoned.

[51] Int. Cl.$^5$ .............................................. C09K 5/00
[52] U.S. Cl. .................................... 252/79; 252/77; 252/76.1
[58] Field of Search .................. 252/67, 77, 78.1, 79; 560/83, 89

[56] References Cited

U.S. PATENT DOCUMENTS

| | | | |
|---|---|---|---|
| 2,528,347 | 10/1950 | Denison, Jr. et al. | 252/75 |
| 2,837,482 | 6/1958 | Agens | 252/49.6 |
| 2,930,811 | 3/1960 | Fields | 252/79 |
| 3,150,146 | 9/1964 | Fields | 252/79 |
| 3,371,108 | 2/1968 | Dissen | 252/78.1 |
| 4,094,850 | 6/1978 | Morgan et al. | 524/380 |
| 4,098,704 | 7/1978 | Sandler | 252/8.6 |
| 4,138,349 | 2/1979 | Brown, Jr. | 252/49.9 |
| 4,298,517 | 11/1981 | Sandler | 260/31.8 HA |
| 4,397,977 | 8/1983 | Sandler | 524/288 |

FOREIGN PATENT DOCUMENTS 0333987 9/1989 European Pat. Off. .
63-178413 7/1988 Japan .
WO89/2887 4/1989 PCT Int'l Appl. .

OTHER PUBLICATIONS

Kirk–Othmer Encyclopedia of Chemical Technology, 3rd Ed. vol. 12, pp. 712–733 John Wiley N.Y. (1981).

Primary Examiner—Prince Willis, Jr.
Assistant Examiner—J. Silbermann
Attorney, Agent, or Firm—Stanley A. Marcus

[57] ABSTRACT

Fire resistant hydraulic fluid compositions comprising (a) one or more esters of polyhaloaromatic acids per se or in combination with (b) one or more hydraulic fluids independently selected from mineral oil, poly-α-olefins, alkylated aromatics, cycloaliphatics, esters of dibasic acids, polyol esters, polyglycols, silicones, silicate esters, phosphate esters, and halogenated compositions other than (a); a method for imparting fire resistant properties to known hydraulic fluids by adding one or more esters of polyhaloaromatic acids alone or combined; and the use of the inventive compositions as fire resistant hydraulic fluids. The fire resistant compositions may, optionally, contain one or more shear-stable polymers which have been found to increase the fire resistance of the hydraulic fluid composition.

26 Claims, No Drawings

FIRE RESISTANT HYDRAULIC FLUIDS

This application is a continuation-in-part of application Ser. No. 07/258,267, filed Oct. 14, 1988, now abandoned, which is hereby incorporated by reference.

BACKGROUND OF THE INVENTION

1. Field of the Invention

This invention relates to flame (fire) resistant hydraulic fluid compositions that comprise at least one ester of a halogen substituted aromatic acid, also referred to as a polyhaloaromatic ester. The esters of this invention may be used alone or in combination with one or more of the following fluids: (A) mineral oils, (B) poly-α-olefins, (C) cycloaliphatics, (D) alkylated aromatics, (E) esters of dibasic acids, (F) silicones, (G) silicate esters, (H) polyol esters, (I) polyglycols, (J) phosphate esters, or (K) organohalide compounds other than the inventive esters. This invention also comprises a method for improving the flame resistance of those materials which either are flammable or have marginal flame resistance, particularly including the above fluids.

The compositions of the present invention may also include one or more shear-stable polymers which have been found to impart additional flame resistance to the hydraulic fluid.

2. Statement of Related Art

Hydraulic fluids find use wherever there is a need to transfer pressure from one point to another in a system. Some of the many commercial applications where fluids are utilized are in aircraft, braking systems, compressors, machine tools, presses, draw benches, jacks, elevators, die-castings, plastic moldings, welding, coal mining, tube reducing machines, paper-machine press rolls, calendar stacks, metal working operations, fork lifts, automobiles, etc.

The use of fire resistant hydraulic fluids is well known in industry. They are needed in those applications where it is necessary to reduce or minimize fire and explosion hazards that may result from leaking, misting or spraying hydraulic fluids onto a hot surface. Examples of applications where fire resistant hydraulic fluids are used are in aircraft and in steel rolling mills as well as high pressure systems such as in die casting machines, hydroelectric turbines, hydraulic presses, compressors, and the like.

A widely used class of fire resistant hydraulic fluids is the phosphate esters or blends containing such, exemplified by many U.S. patents including U.S. Pat. Nos. 2,862,886; 4,370,281; and 4,645,615.

Halogenated fluids have also found use as fire resistant hydraulic fluids. These include chlorinated, brominated, as well as fluorinated types and also are exemplified by many U.S. patents including, among others, U.S. Pat. Nos. 2,528,347; 4,577,044; and 4,596,664.

The esters of polyhaloaromatic acids useful in this invention have been used as flame-proofing materials for unrelated materials. For example, U.S. Pat. No. 4,098,708 describes the use of haloester compounds as flame retardant textile finishing agents. U.S. Pat. No. 4,298,517 and 4,397,977 disclose using haloester compounds as flame retardants for halogenated resins. There are no known references disclosing the use of esters of polyhaloaromatic acids as fire resistant hydraulic fluids per se, or as components of fire resistant hydraulic fluid compositions.

Shear-stable polymers are often added to hydraulic fluids to improve the fluids's temperature viscosity characteristics. Because of their structure and/or low molecular weight, generally below 25,000, these polymers resist degradation due to mechanical shear, such as that encountered in hydraulic pumps. A further discussion of shear-stable polymers and shear induced degradation may be found in the Kirk-Othmer Encyclopedia of Chemical Technology, Third Ed., Vol. 12 (pp. 712–733, particularly pg. 721), Vol. 14 (pp. 477–526, particularly pp. 495–6), John Wiley & Sons, New York, 1981. Also see the American Society for Testing Materials 1989 Annual Book of ASTM Standards, Section 5, Petroleum Products and Lubricants, Vols. I–III (Method D2603-76, Standard Test Method for Sonic Shear Stability of Polymer-Containing Oils and Method D3945-86, Standard Test Methods for Shear Stability of Polymer-Containing Fluids Using a Diesel Injector Nozzle) for standard methods of measuring the shear stability of blends of polymers in oils.

The misting properties of a hydraulic fluid are known to affect the fluid's fire resistance. The fire-resistance of a hydraulic fluid is commonly tested by the Factory Mutual Research Test Procedure for Less Hazardous Hydraulic Fluids, Class No. 6930. This method attempts to ignite the mist of the tested oil with a propane flame or heated metal surface. If the fluid ignites, the time required for self-extinguishment is then measured. Common polyol ester hydraulic fluids, such as trimethylol trioleate, exhibit poor or marginal performance in the Factory Mutual Test.

The misting properties of the hydraulic fluid can be modified through the addition of coalescing polymers, such as polyisobutylene, which cause larger droplet formation. This increase in droplet size is due to an increase in viscosity and the coalescence of smaller fluid droplets. When coalescing polymers are added to the same polyol ester fluid, the droplet size increases sufficiently to inhibit both the ignition and flame propagation properties of the mist to pass the Factory Mutual Test. Unfortunately, because of their relatively high molecular weight, i.e. 50,000–200,000, coalescing polymers have low shear stability. Thus, the usefulness of these polymers is limited in hydraulic fluid application because of degradation due to mechanical shear in hydraulic fluids.

SUMMARY OF THE INVENTION

Fire resistant hydraulic fluid compositions are provided which comprise of one or more esters of a polyhaloaromatic acid as described herein, preferably one or more polyhalophthalate esters, or a mixture of one or more such esters with one or more known hydraulic fluids. Useful hydraulic fluids known in the art include: (A) mineral oils; (B) poly-α-olefins; (C) cycloaliphatics; (D) alkylated aromatics; (E) esters of dibasic acids; (F) polyol esters; (G) polyglycols; (H) silicones; (I) silicate esters; (J) phosphate esters; and (K) fluorinated, chlorinated, and brominated halogen compounds other than the described esters. However, this invention also comprises mixtures of the inventive esters with all substances which are useful as hydraulic fluids, provided that the substances and esters are not deleteriously affected by the combination. The inventive compounds and compositions provide fire resistant hydraulic fluids having high autoignition temperatures, low volatility, and low flame propagation rates.

When the inventive polyhaloaromatic esters are combined with hydraulic fluids, they should comprise at least 1 wt. %, preferably at least 10 wt. %, most preferably at least 20 wt. % of the weight of the combination.

An important consideration for a fire-resistant hydraulic fluid is that its autogenous ignition (autoignition) temperature should be above about 750° F. (400° C.). [See U.S. Pat. No. 3,730,889] This and other important properties such as appropriate lubricating viscosity under high and low temperature conditions, stability at high temperatures, lubricating ability, oxidation stability, compatibility with materials of construction (e.g., metals, elastomers), antiwear properties, corrosion resistance, etc. may be achieved by the compositions of this invention by utilizing the proper combination of components.

In another embodiment, the fire resistant properties of known hydraulic fluid compositions can be improved by the addition of the inventive esters of polyhaloaromatic acid per se, or the addition of the inventive combination compositions.

In yet another embodiment, it has been found that an even higher degree of flame resistance can be achieved when one or more shear-stable polymers are added to the hydraulic fluid compositions of the present invention. Useful shear-stable polymers known in the art include: polymers of acrylate and methacrylate esters; liquid $C_{4-12}$ polyolefins; styrene-butadiene copolymers; polyoxyalkylene glycols and glycol ethers; polyesters of dibasic carboxylic acids and glycols; copolymers of ethylene and propylene; and copolymers of styrene and $C_{2-4}$ olefins These shear-stable polymers have shear stability indices below 25, and preferably below 15, as measured by ASTM D3945. The shear-stable polymers generally comprise at least 0.5 wt. % and, preferably, at least 2.0 wt. % of the total weight of the flame resistant hydraulic fluid composition.

DETAILED DESCRIPTION OF THE INVENTION

Other than in the operating examples, or where otherwise indicated, all numbers expressing quantities of ingredients or reaction conditions used herein are to be understood as modified in all instances by the term "about".

The halogen substituents on the aromatic esters of this invention are preferably chlorine or bromine, bromine being particularly preferred. Moreover, it is desirable that the halogen substituents comprise a large percentage of the ester, preferably at least 25 weight percent, more preferably at least 35 weight percent. In the case of the preferred bromine-substituted esters described below, the bromine may comprise in excess of 40 or 45 weight percent of the ester. The maximum halogen content achievable varies with the ester, and may be as high as 80 weight percent. The high weight percent of halogen is important since the halogen is believed to be largely responsible for the flame resistant properties.

Preferred esters of polyhaloaromatic acids useful as fire resistant hydraulic fluids per se or in the compositions of the present invention have one of the following formulas:

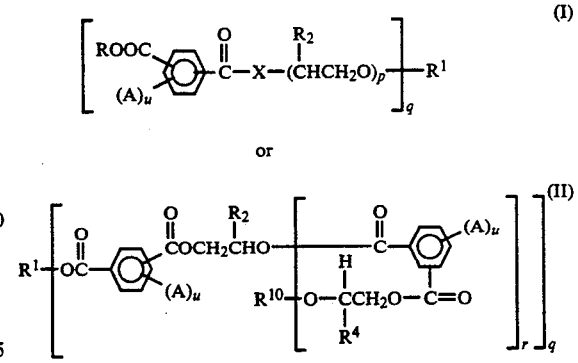

wherein:
(a) the rings can have all possible isomeric arrangements;
(b) R is substituted or unsubstituted $C_{1-30}$ alkyl, hydroxy $C_{2-20}$ alkyl, polyhydroxy $C_{3-10}$ alkyl, or

where $R^2$ and $R^8$ are as defined below, and b is 1 to 50;
(c) $R^1$ is H, branched, or linear substituted or unsubstituted saturated $C_{1-30}$ alkyl or unsaturated $C_{2-22}$ alkyl, or

and $R^7$ is as defined below,
(d) $R^2$ is, independently, H or $CH_3$;
(e) $R^3$ and $R^4$ are, independently, H, $C_{1-18}$ alkyl, halogen substituted $C_{1-18}$ alkyl, $OR^5$, OH, or

(f) $R^5$ is $C_{1-22}$ alkyl;
(g) $R^6$ is H or $C_{1-22}$ alkyl;
(h) $R^7$ is $C_{1-18}$ alkyl, polyhyroxy $C_{3-12}$ alkyl,

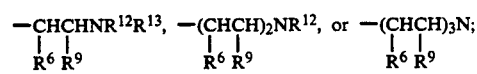

(i) $R^8$ is branched or linear substituted or unsubstituted $C_{1-18}$ alkyl;
(j) $R^9$ is H or $C_{1-22}$ alkyl;
(k) $R^{10}$ is H,

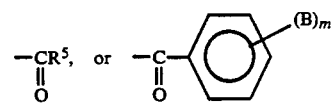

where B and m are defined below;
(l) $R^{12}$ is H or $C_{1-22}$ alkyl;
(m) $R^{13}$ is H or $C_{1-22}$ alkyl;
(n) A is Cl or Br;
(o) B is halogen, OR5, or

(p) X is O or NH;
(q) m is 1 to 5
(r) p is 0 or an integer of 1 to 50;
(s) q is an integer of 1 to 6;
(t) r is 0.1 to 50; and
(u) u is 1 to 4.

The term "substituted" in the above moiety definitions refers to the inclusion of at least one ether, hydroxyl, ester, halo, amino, amido, or cyano moiety on the alkyl chain.

The esters described above may be used as the only components of the fire resistant hydraulic fluids or maybe blended with one or more of the following known hydraulic fluids.

Mineral Oils of varying lubricating viscosities.

(B) Poly-α-olefins (olefin oligomers) having the general formula:

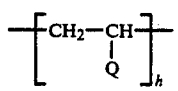

where h is 3 to 10 and Q is a $C_{4\text{-}10}$ alkyl.

(C) Cycloaliphatics in which an aliphatic hydrocarbon is substituted by at least one cycloalkyl (e.g., cyclohexyl). A typical example would be 2,3-dicyclohexyl-2-3-dimethylhexane; i.e.

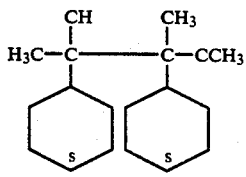

(D) Alkylated Aromatics in which one or more (preferably two or more) C alkyl moieties are substituted on the benzene ring. Preferred, compounds are

where T is a linear $C_{10\text{-}14}$ alkyl and e is $>1$.

(E) Esters of Dibasic Acids which are prepared by the reaction of a dibasic acid with a monohydroxy alcohol and have the general formula:

wherein $R^{14}$ is $C_{4\text{-}8}$ alkylene and each $R^{15}$ independently is $C_{8\text{-}13}$ alkyl. Typical examples of dibasic acids are adipic, azelaic, sebacic and of alcohols are 2-ethyhexyl, 3,5,5-trimethyl-hexyl, isodecyl, and tridecyl.

(F) Silicones, which are fluids having a polymer structure. A typical example of a silicone fluid is dimethylpolysiloxane.

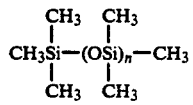

where n is $>1$.

Many silicones are fire resistant by themselves.

(G) Silicate esters having the general formula:

wherein $R^{16}$ is $C_{1\text{-}30}$ alkyl or $C_{6\text{-}14}$ aryl, or substituted aryl.

(H) Polyol ester fluids formed by reacting a diol or polyol with a monocarboxylic acid. Two commonly used polyols are trimethylolpropane and pentaerythritol. The monocarboxylic acid should contain 5 to 30 (preferably 5 to 10) carbon atoms. Many other polyesters are suitable as a component of the compositions of this invention.

(I) Polyglycol fluids (polyalkylene glycol ethers) of the formula

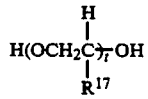

wherein $R^{17}$ is H or $C_{1\text{-}3}$ alkyl and t is $>1$ to 50.

(J) Phosphate Esters are one of the larger volume classes of synthetic lubricating fluids and comprise the largest segment of the water-free fire resistant hydraulic fluids market. They have the general formula: $O=P-(OR^{18})_3$ where $R^{18}$ is independently $C_{1\text{-}30}$ alkyl, $C_{6\text{-}22}$ aryl or substituted aryl. The most common class is when $R^{18}$ is an aryl or substituted aryl.

(K) Organohalides other than polyhaloaromatic esters are hydrocarbons or substituted hydrocarbons which contain chlorine, bromine, or fluorine, or combinations thereof. This class of compounds is considered fire resistant.

A more complete description of hydraulic fluids (A) to (K), inclusive, may be found in Kirk-Othmer "Encyclopedia of Chemical Technology", Third Edition, (pub.) Vol. 12, pp. 712–733 (1980).

One or more shear-stable polymers may, optionally, be added to the esters described above or to the blends thereof with the hydraulic fluids (A) to (K). It has been found that when the shear stable polymer is added to a hydraulic fluid blend containing the above-described esters, an even higher degree of flame resistance is achieved. This is surprising since these shear stable polymers are of too low of a molecular weight to be expected to function as a coalescing agents. Thus, these shear-stable polymers improve both the fire-resistance and shear stability of the hydraulic fluid compositions of the present invention.

These shear-stable polymers are added to the polyhaloaromatic esters per se when the esters are used alone as the hydraulic fluid, or to the blends of the polyhaloaromatic esters and the hydraulic fluids (A) to (K). In either application, the shear-stable polymer should contain at least 0.5 wt. % and, preferably, at least 2.0 wt. % of the total composition weight. The maximum amount of shear-stable polymers added to the composition is generally limited by economics, but will typically not exceed 20.0 wt. % of the total composition weight. Suitable shear-stable polymers for use in the present invention include one or more of the following:

Polyacrylate and Polymethacrylate Esters, preferably of the general formula:

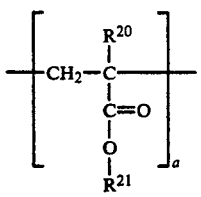

where $R^{20}$ is H or $CH_3$, $R^{21}$ is $C_{6-18}$ alkyl and $a>1$ providing that the molecular weight is between 1,000 and 25,0000. These polymers are commercially available from the Rohm & Haas Company under the Acryloid ® trademark;

Liquid $C_{4-12}$ Polyolefins, preferably of the general formula:

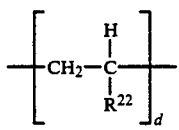

where $R^{22}$ is $C_{2-10}$ alkyl, preferably $C_{6-10}$ alkyl and most preferably $C_8$ alkyl and $d>1$ provided that the molecular weight is between 1,000 and 25,000;

Styrene-butadiene Copolymers, preferably of the general formulas:

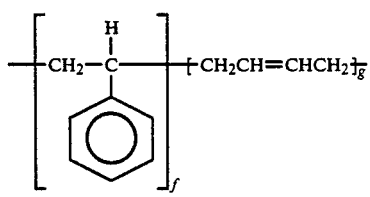

or

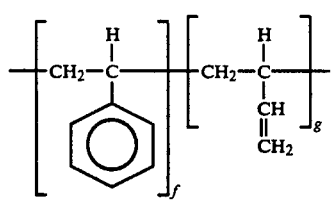

where f and g are each $>1$, provided that the molecular weight is between 1,000 and 25,000 and the weight ratio of styrene to butadiene is between about 8:2 to about 2:8. These copolymers are commercially available from the Lubrizol Corporation under the Lubrizol ® trademark;

Polyoxyalkylene Glycols and Glycol Ethers, preferably of the general formula:

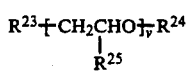

where $R^{23}$ and $R^{24}$ are, independently, H or $C_{1-18}$ alkyl, preferably $C_{2-12}$ alkyl, $R^{25}$ is H, $CH_3$ or $C_2H_5$ and may be the same or different in each repeat unit and $v>1$, provided the molecular weight is between 1,000 and 25,000. These polymers are commercially available from Union Carbide Corp. under the Ucon ® trademark;

Polyesters formed by reacting Dibasic Carboxylic Acids with Glycols and preferably having the general formula:

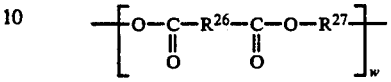

where $R^{26}$ is $C_{2-10}$ alkyl, preferably $C_{3-7}$ alkyl, or $C_{34}$ branched cyclic hydrocarbon moiety of dimer acids formed by dimerization of linoleic acid, $R^{27}$ is $C_{2-10}$ alkyl, preferably $C_{2-4}$ alkyl, and $w>1$ provided the molecular weight is between 1,000 and 25,000. These polymers are commercially available from the C. P. Hall Co. under the Plasthall ® trademark and the Henkel Corp. under the Emolein ® trademark;

Copolymers of Ethylene and Propylene, preferably having the general formula:

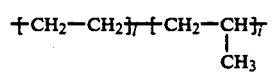

where l and i are each $>1$ provided the molecular weight is between 1,000 and 25,000 and the weight ratio is ethylene to propylene is between about 8:2 and about 2:8;

Copolymers of Styrene and the $C_{2-4}$ Olefins, preferably having the general formula:

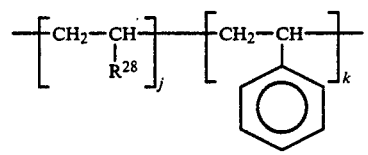

where $R^{28}$ is H, $CH_3$ or $C_2H_5$ and may be the same or different in each repeat unit, j and k are each $>1$ provided the molecular weight is between 1,000 and 25,000, and the weight ratio of styrene:olefin is between about 8:2 and about 2:8.

These shear-stable polymers have shear stability indices below 25, and preferably below 15, as measured by ASTM method D3945.

The preferred shear-stable polymers useful in this invention are the following:

Polymethacrylate esters such as Acryloid ® 705, 1017, and 1019;

Polybutenes of molecular weights less than 10,000 and poly(1-decene) of viscosity greater than 25 centistokes at 100° C.;

Styrene-butadiene Copolymer such as the Lubrizol ® 7400 Series;

Polyoxyethylene Glycol Ethers of molecular weights less than 10,000 such as Ucon ® LB or HB; and Polyesters of Dibasic Carboxylic Acids and Glycols such as Plasthall ® P-550 or Emolein ® dimer acid polyester plasticizers.

The compositions of this invention are generally prepared in any convenient manner such as uniformly blending under ambient conditions. When blending those compositions incorporating the shear-stable polymers, it is preferable to heat to a temperature below about 200° F. to facilitate uniform mixing of the more viscous shear-stable polymer. Additives known in the art to improve other hydraulic fluid properties may be added if desired. Such additives may include but are not limited to viscosity modifiers, rust and oxidation inhibitors, defoamers, pour point depressants, dispersants, wear inhibitors, corrosion inhibitors, friction-reducing compounds, extreme pressure additives, and the like.

It is a preferred embodiment that in combination in the inventive ester of formula (I), R is $C_{1-12}$ alkyl or substituted alkyl, A is Br, X is oxygen, p is 0 to 20, and q is 1 to 6. More preferably:
R is

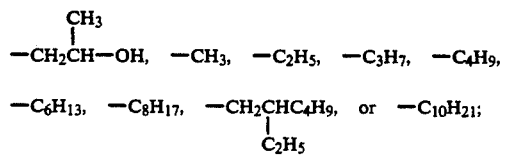

$R^1$ is $CH_3$, $C_2H_5$, $C_4H_9$, H, $-C_3H_7$, $-C_6H_{13}$, $-C_8H_{17}$,

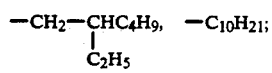

or

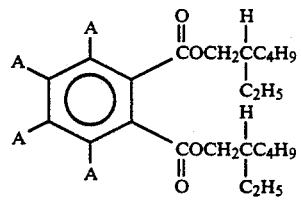

and
q=1.

It is also a preferred embodiment that in combination in the inventive ester of formula (II), $R^1$ is hydrogen or $C_{1-22}$ alkyl or substituted alkyl; $R^3$ and $R^4$ are independently hydrogen, $-CH_3$, $-CH_2Cl$, $-C_2H_5$, $-C_4H_9$ or $-C_8H_{17}$; A is Br; X is oxygen; p is 0 to 20; q is 1 to 6; r is 0.10 to 5; and u is 2 to 4. More preferably $R^3$ and $R^4$ are independently H, $-CH_3$, or $-CH_2Cl$; q is 1, r is 0.25 to 2; and u is 4.

The inventive esters may be made by any known methods as exemplified in Examples 1-68.

The following formulas are for representative polyhaloaromatic esters which may be used in practicing this invention. The substituent moiety A is a halogen and is preferably bromine or chlorine, most preferably bromine.

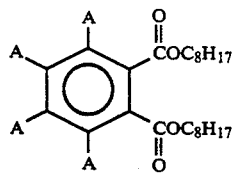

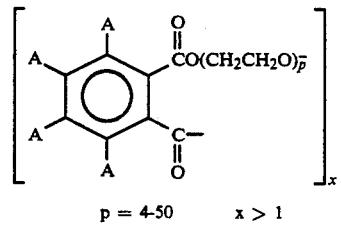

p = 4-50    x > 1

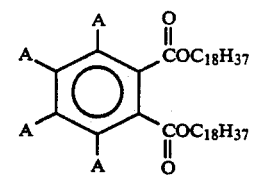

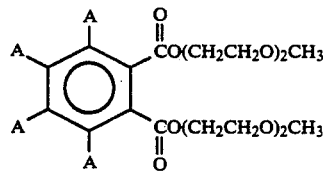

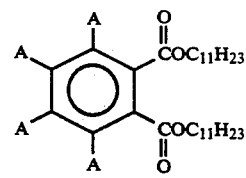

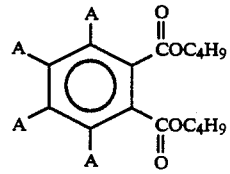

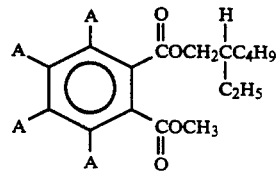

-continued
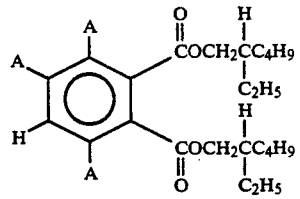
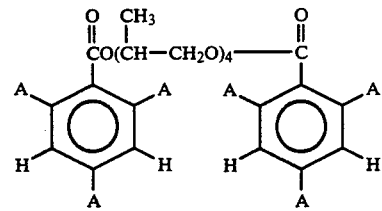
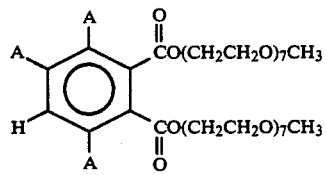
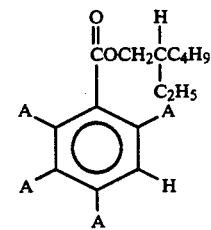
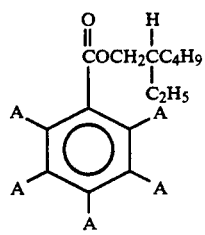
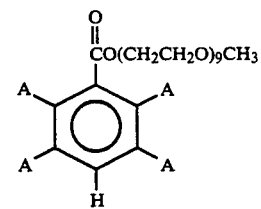
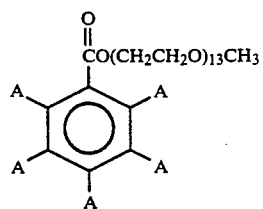
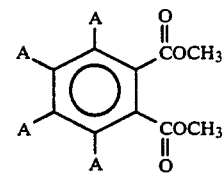
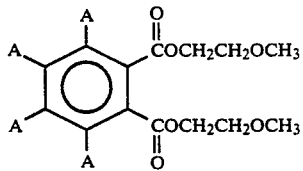
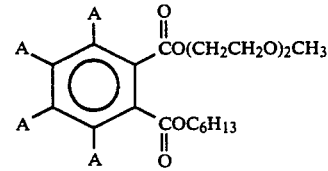
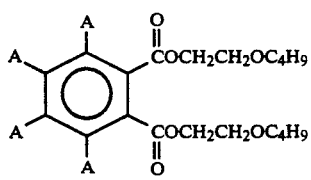
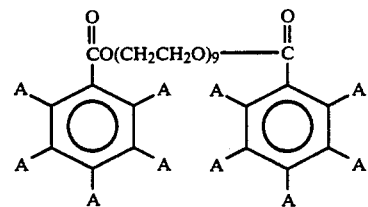
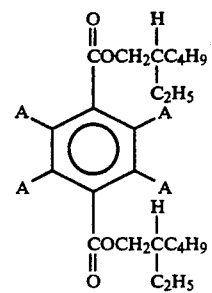
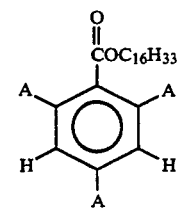

-continued
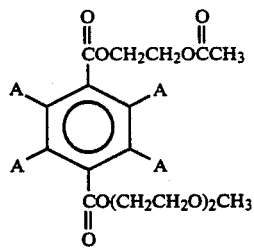
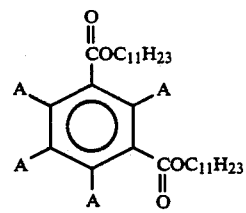
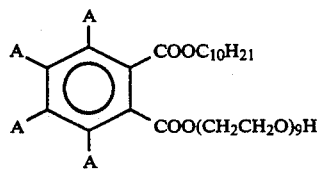
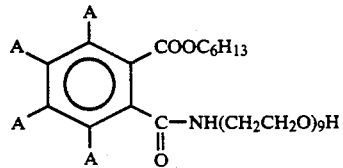
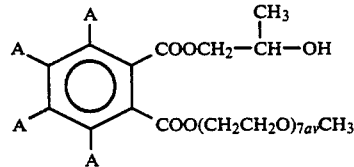
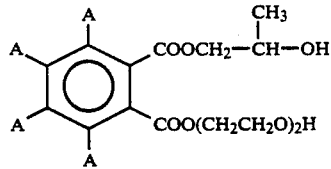
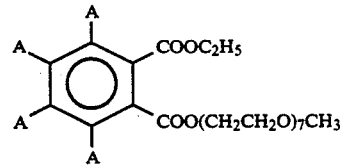
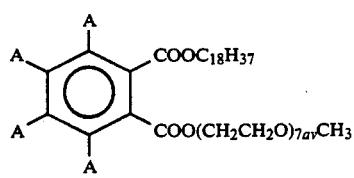
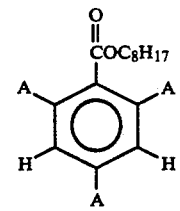
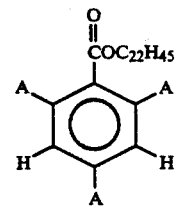
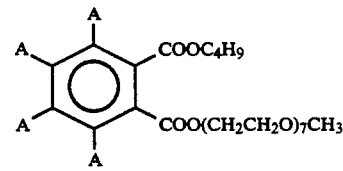
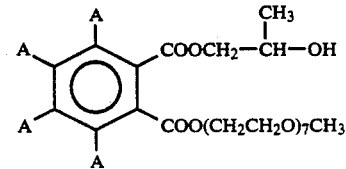
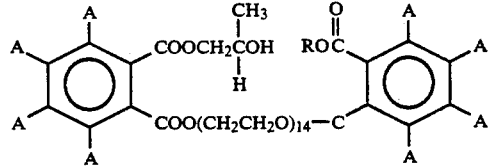
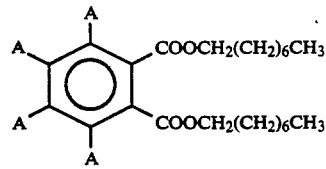
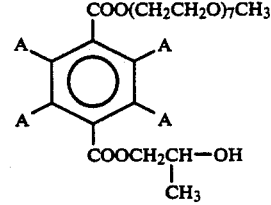
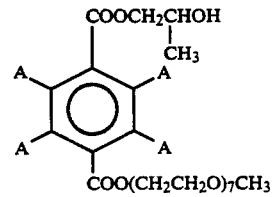

-continued
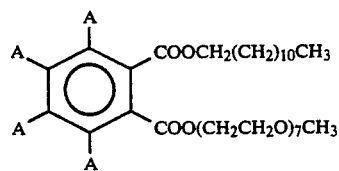
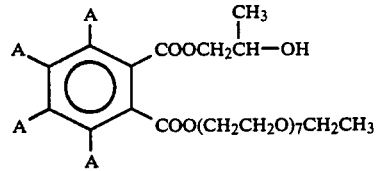
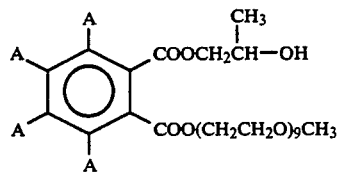
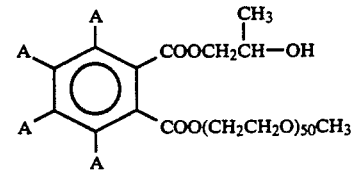
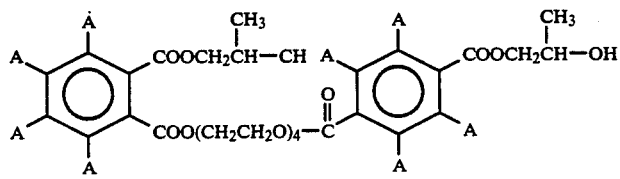
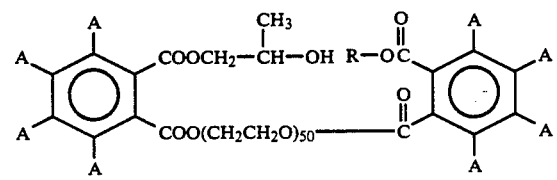
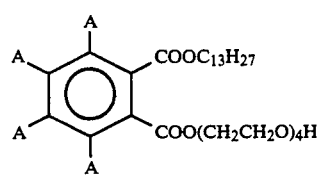
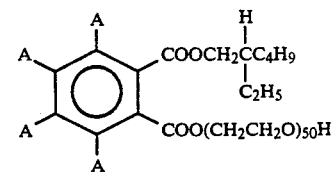
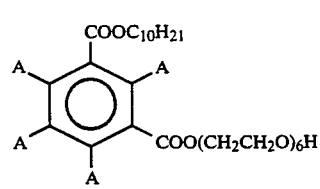
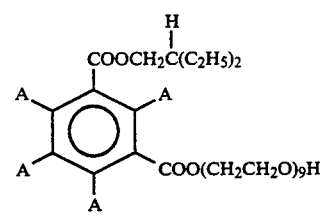
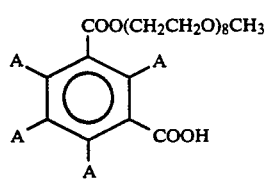
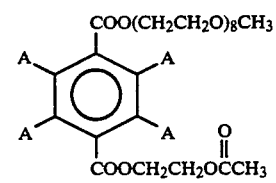
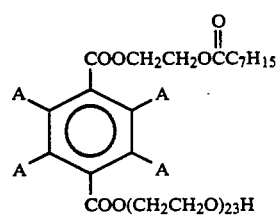
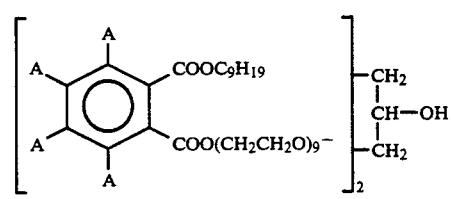

-continued
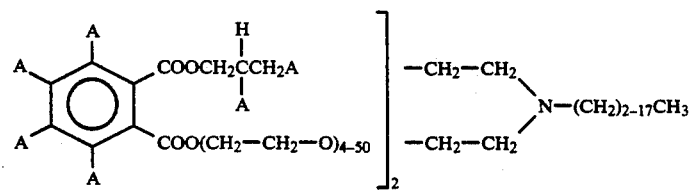
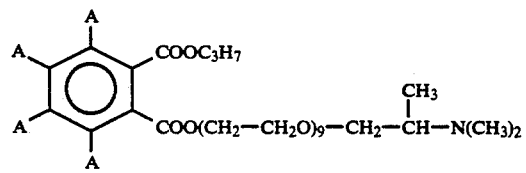
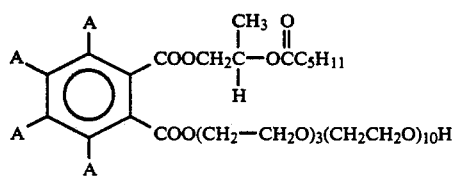 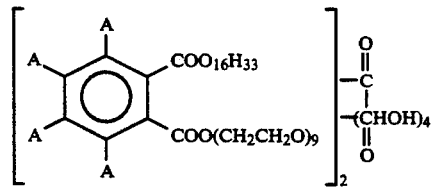
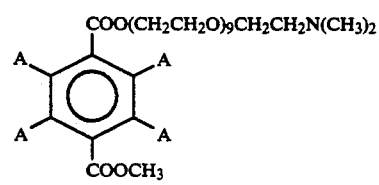
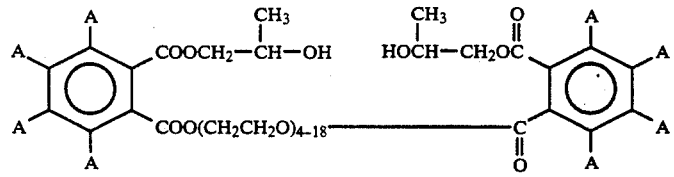
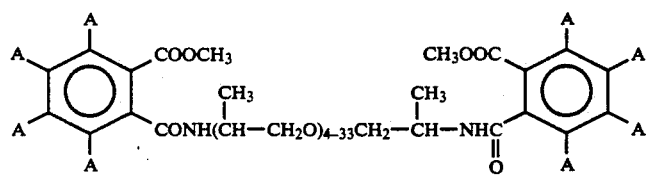
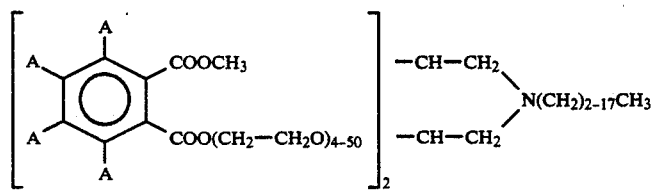

-continued
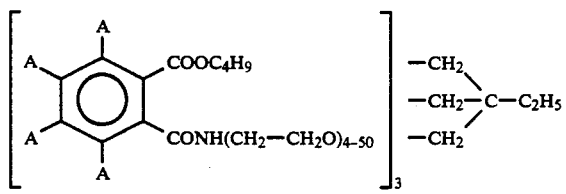
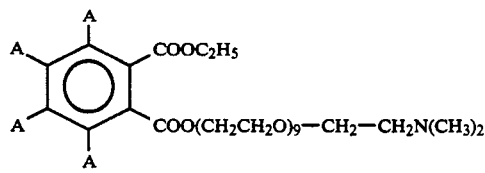
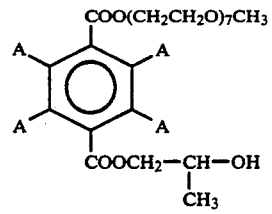
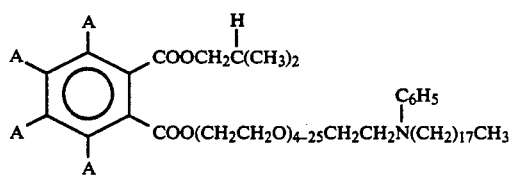
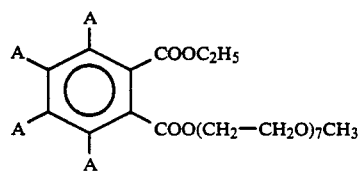
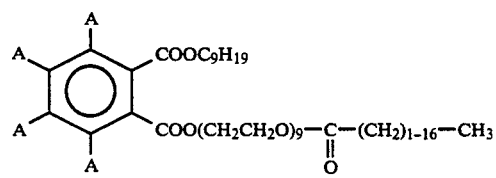
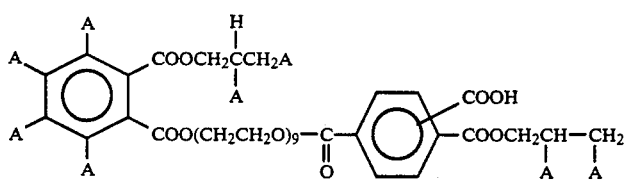
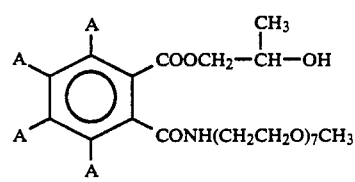
The preferred compounds are:
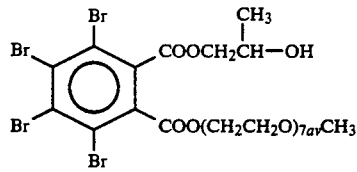
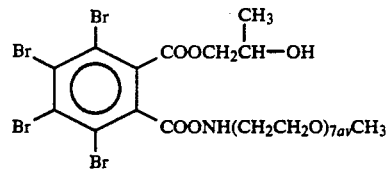
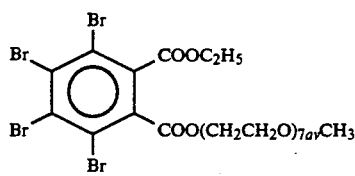
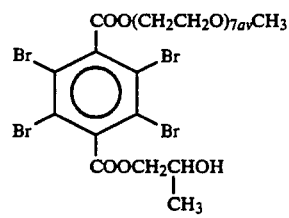
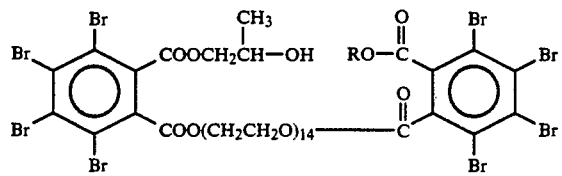

-continued
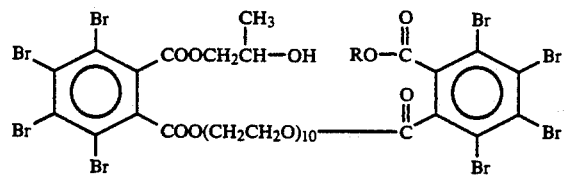
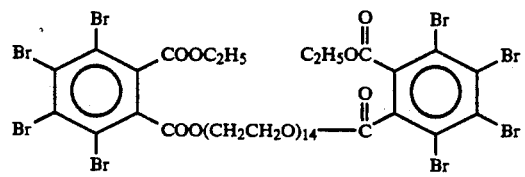
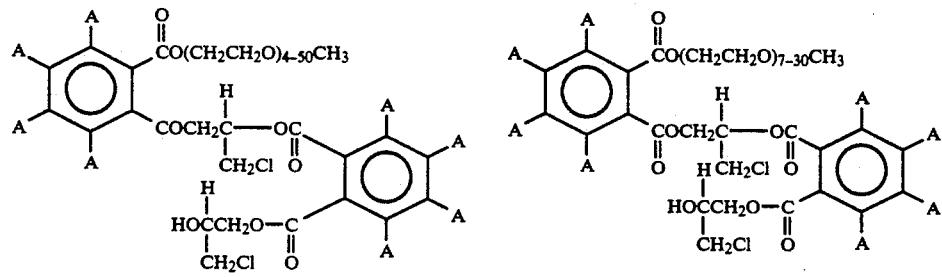
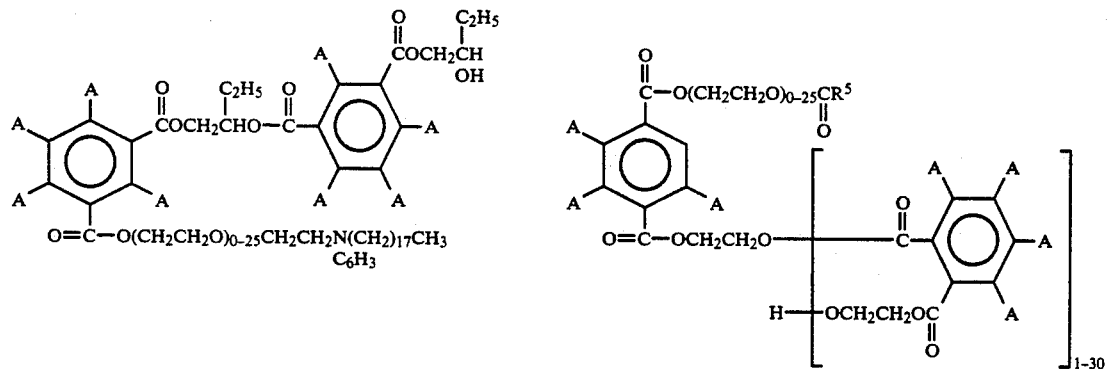
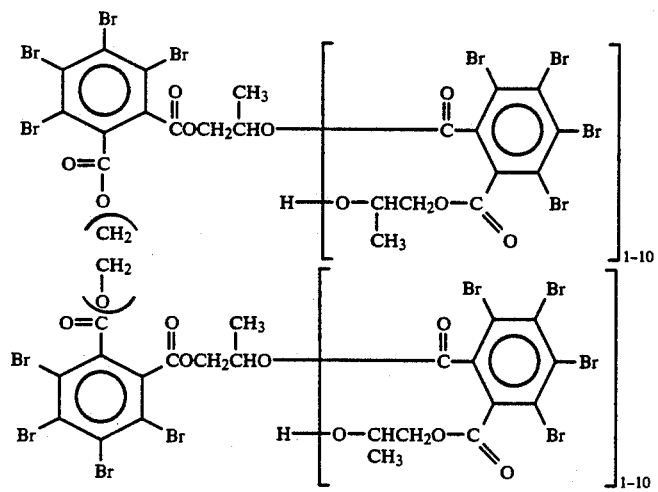

-continued
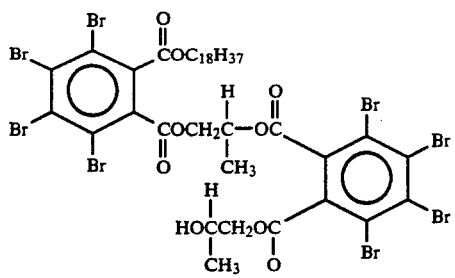
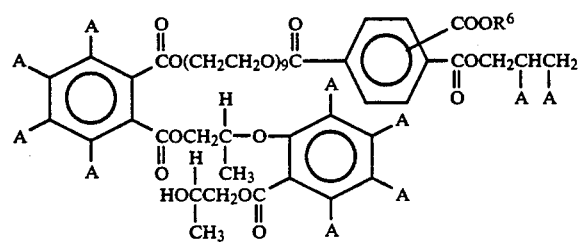
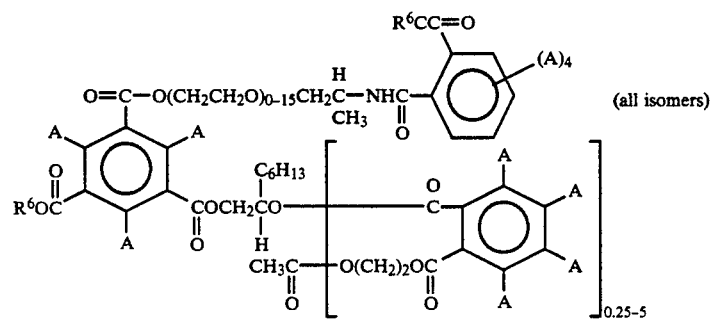
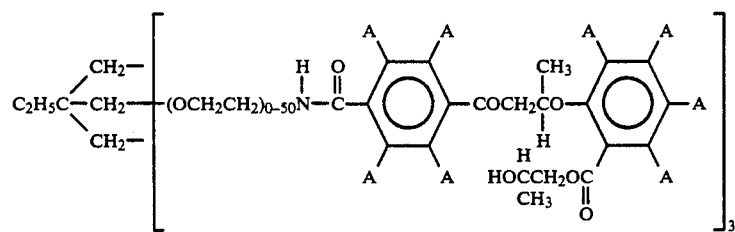
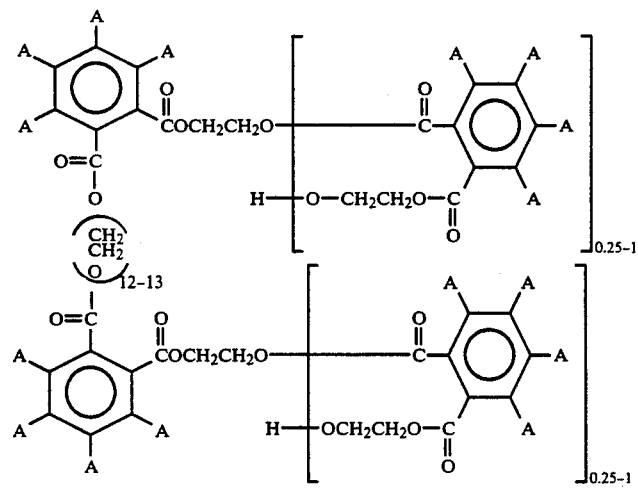

-continued
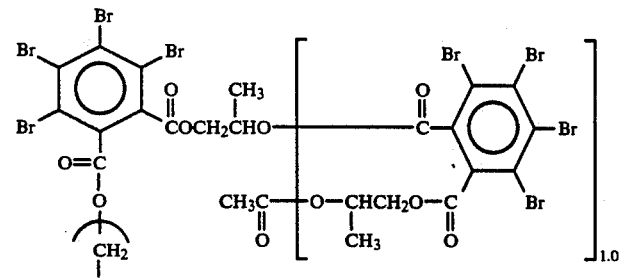
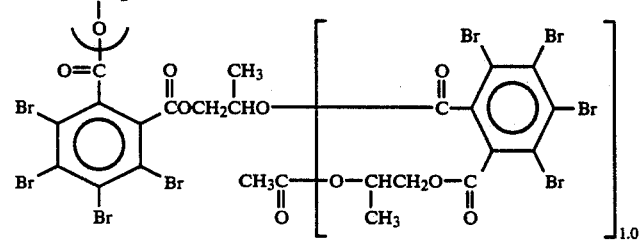
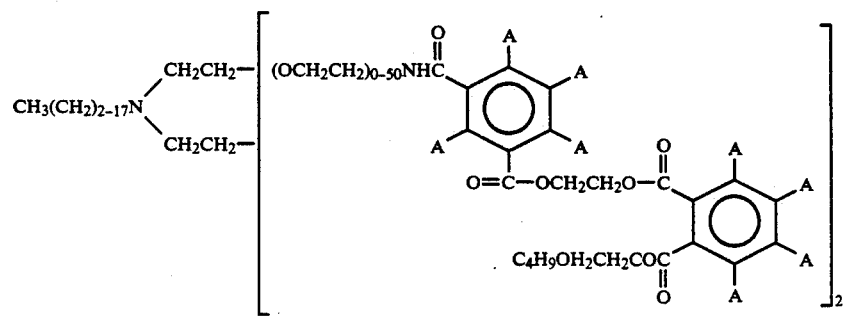
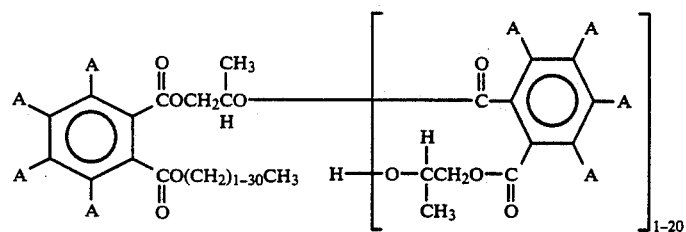
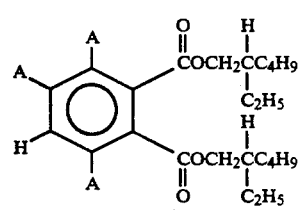
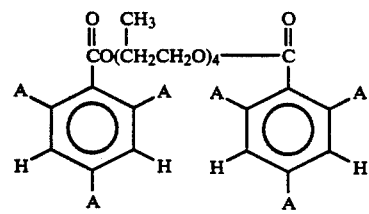
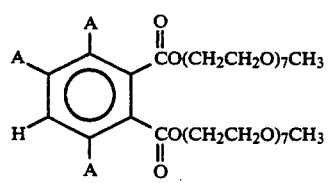
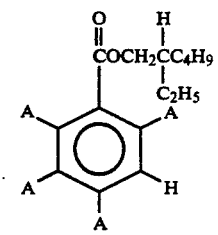

-continued
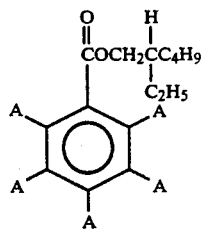
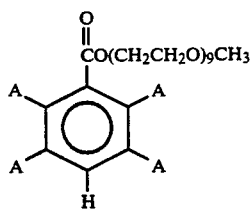
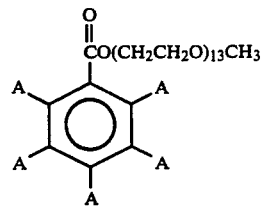
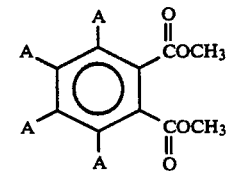
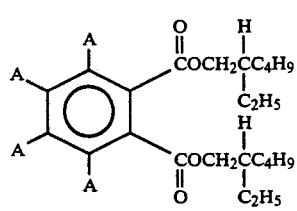
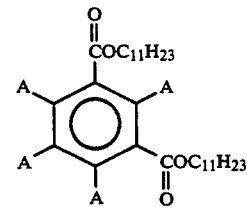
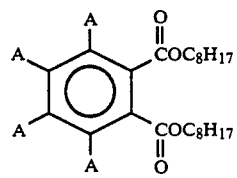
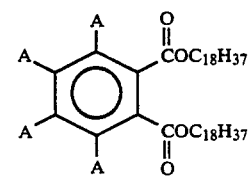
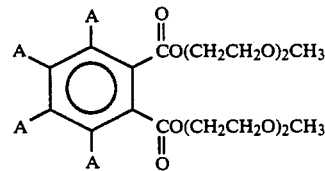
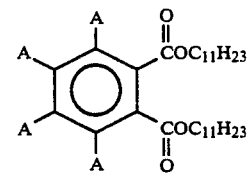
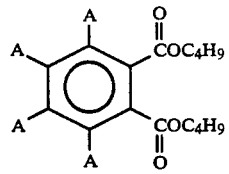
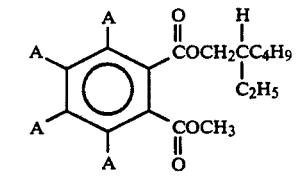
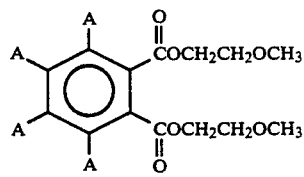
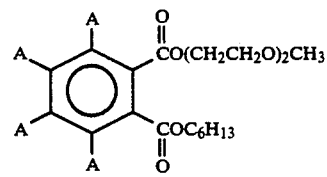
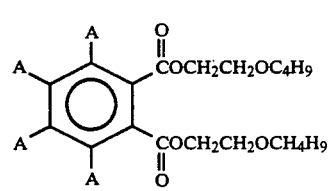
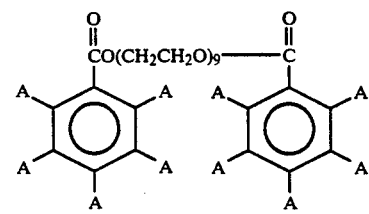

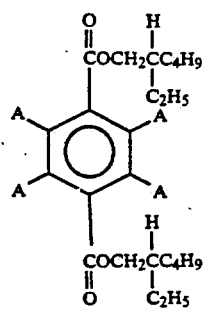 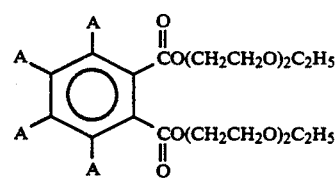

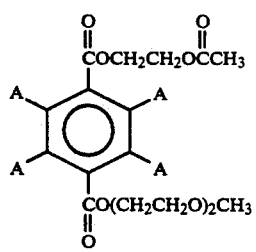

Preparation of Inventive Esters

EXAMPLE 1

To 1,392 g (3.0 mols) of tetrabromophthalic anhydride were added 1,050 g (3.0 mols) of Methoxy "Carbowax" 350 in the presence of 22.0 g of sodium acetate. The mixture was heated at 90° C. for 8 hours in a nitrogen atmosphere. The reaction mixture was filtered hot to remove the sodium acetate. The analytical data were consistent with the assigned structure. ["Carbowax" is a trademark of Union Carbide Corp. for polyethylene glycols and methoxypolyethylene glycols, the number following being the approximate polymer molecular weight.]

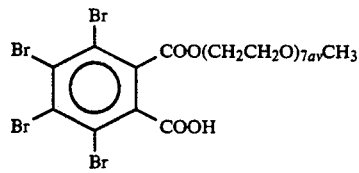

EXAMPLE 2

To the compound of Example 1 were added 348.0 g (6.0 mols) of propylene oxide and 2.0 liters of toluene. The mixture was heated at 60°-100° C. The solvent and residual propylene oxide were removed to give the product in almost quantitative yield. The analytical data were consistent with the assigned structure:

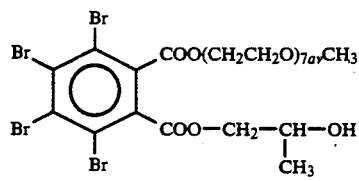

EXAMPLE 3

To 92.8 g (0.2 mol) of tetrabromophthalic anhydride was added all at once 80 g (0.2 mol) of "Carbowax" 400 and the mixture heated to 120°-130° C. for 2.5 hours. The desired product was isolated in essentially quantitative yield as a clear yellow viscous liquid. Calcd. Mol. Wt., 864; found 865. Calcd. % Br, 371; found, 38.5. The analytical data were consistent with the assigned structure:

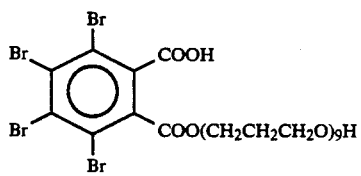

EXAMPLE 4

To 240 g (0.24 mol) of the compound of Example 3 was added 45.3 g (0.24 mol) of trimellitic anhydride and the mixture heated at 155° C. under nitrogen for about 7 hours. The infrared spectrum indicated the completion of the reaction by the substantial disappearance of the anhydride absorption band at 5.65. The product was isolated in essentially quantitative yield. Analy. Calcd.; % Br, 30.3%; Mol. Wt., 1056; neutralization equivalent, 352; Found: % Br, 29.4; Mol. Wt., 1014; neutralization equivalent, 351. The spectral data was consistent with the structure:

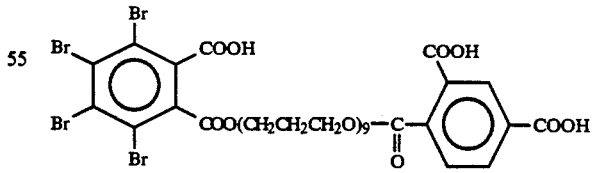

EXAMPLE 5 (THEORETICAL)

To 284.0 g (1.0 mol) of tetrachlorophthalic anhydride can be added 350.0 g (1.0 mol) of methoxy "Carbowax" 350 in the presence of 7.0 g of sodium acetate. The mixture is then heated at 90° C. for 8 hours in a nitrogen atmosphere, after which it is filtered hot to remove sodium acetate, to give an expected product with the assigned structure:

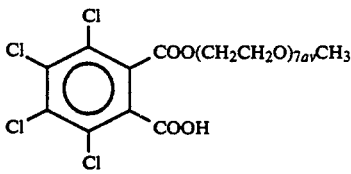

EXAMPLE 6 (THEORETICAL)

To 634.0 g (1.0 mol) of the composition of Example 5 can be added 116 g (2.0 mols) of propylene oxide in 200 ml of toluene. The reaction mixture is heated to from 60°-100° C. for 3-5 hours, and then concentrated to give a product with the assigned structure:

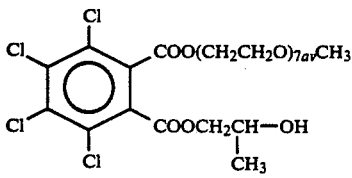

EXAMPLE 7 (THEORETICAL)

To 284.0 g (1.0 mol) of tetrachlorophthalic anhydride can be added 200.0 g (1.0 mol) of "Carbowax" 200 in the presence of 7.0 g of sodium acetate. The mixture is then heated at 90° C. for 8 hours in a nitrogen atmosphere, and is filtered hot to remove sodium acetate, to generate an expected product with the assigned structure:

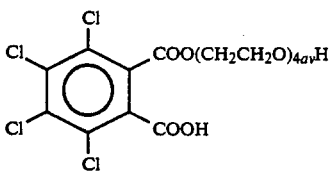

EXAMPLE 8

To 484.0 g (1.0 mol) of the product of Example 7 can be added 116.0 g (2.0 mol) of propylene oxide in 200 ml of toluene. The reaction mixture is then warmed at 60°-100° C. for 3-5 hours, and concentrated to give a product with the assigned structure:

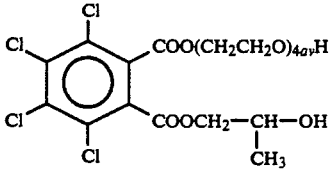

EXAMPLE 9

Poly(ethylene glycol) 300, 204.5 g (0.67 mol) was refluxed (T=117° C.) with 600 ml of toluene for 1.5 hours in order to remove a small amount of water present in the glycol. The mixture was cooled to about 100° C.; tetrabromophthalic anhydride, 614.5 g (1.35 mols) and sodium acetate, 1.62 g were added; and the mixture was reheated to reflux and held for 25 hours. After the mixture was cooled to 50° C., propylene oxide, (156.4 g, 2.69 mols, 100% excess) was added and the mixture heated to and held at 100° C. for 2.5 hours. When the solution cooled to about 50° C. it was filtered through a bed of diatomaceus earthand decolorizing charcoal. The filtrate was distilled to remove the solvent to give 904.1 g of product as a viscous liquid. Calcd. % Br, 47.4. Found % Br, 46.5. Analytical data is consistent with the assigned structure:

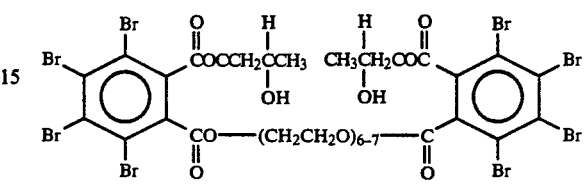

EXAMPLE 10

This compound was prepared by the procedure described in Example 9 except that poly(ethylene glycol)200 was used in place of poly(ethylene glycol)300. The product was a viscous liquid. Calcd. % Br, 51.0. Found % Br, 49.3. Analytical data was consistent with the assigned structure:

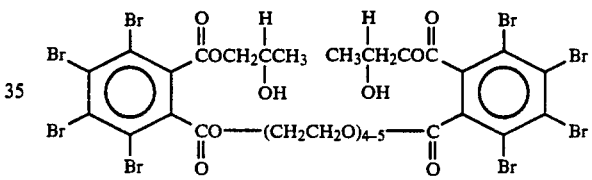

EXAMPLE 11

This compound was prepared by the procedure described in Example 9 except that poly(ethylene glycol)600 was used in place of poly(ethylene glycol)300. The product was a viscous liquid. Calcd. % Br, 39.5. Found % Br, 39.3. Analytical data was consistent with the assigned structure.

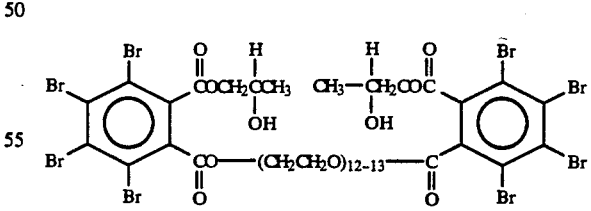

EXAMPLE 12

This compound was prepared by the procedure described in Example 9 except that poly(ethylene glycol)400 was used in place of poly(ethylene glycol)300. Product is a viscous liquid. Calcd. % Br, 44.2. Found % Br, 44.0. Analytical data is consistent with the assigned structure:

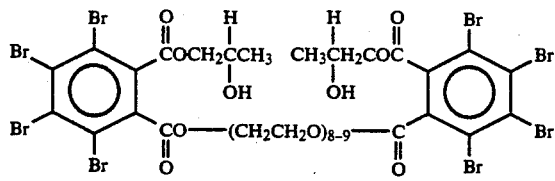

EXAMPLE 13

Methanol (54.1 g, 1.5 mol), tetrabromophthalic anhydride (695.6 g, 1.6 mols), and potassium acetate, 2.73 g were refluxed for 4 hours with 500 ml of toluene. After cooling the reaction mixture to room temperature, propylene oxide (87.12 g, 1.5 moles) added and the mixture reacted at 80° C. for 2.5 hours. Product was obtained as a viscous liquid after distilling out the toluene. Calcd. % Br, 57.7. Found % Br, 57.2. Analytical data is consistent with assigned structure.

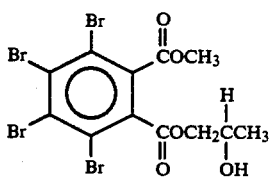

EXAMPLE 14

This compound was prepared by the procedure similar to that described in Example 13 except that methoxy "Carbowax" 350 was used in place of methanol and ethylene oxide in place of propylene oxide. Calcd. % Br, 37.8. Found % Br,37.2. Analytical data was consistent with assigned structure:

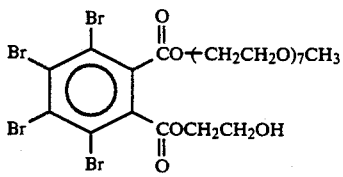

EXAMPLE 15

This compound was prepared by the procedure in Example 13 except that 2-methoxyethanol was used in place of methanol. Product was a viscous liquid. Calcd. % Br, 53.6. Found % Br, 52.0. Analytical data was consistent with the assigned structure:

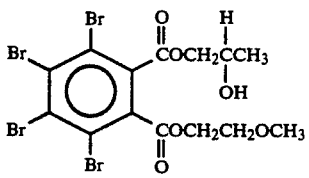

EXAMPLE 16

This compound was prepared by the procedure outlined in Example 13 except that methoxy "Carbowax" 350 was used in place of methanol and epoxybutane in place of propylene oxide. Product was a viscous liquid. Calcd. % Br, 36.5. Found % Br, 37.2. Analytical data was consistent with the assigned structure:

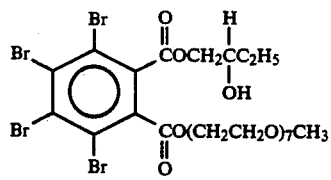

EXAMPLE 17

This compound was prepared by the procedure outlined in Example 13 except that 2-ethylhexanol-1 was used in place of methanol. Product was a viscous liquid. Calcd. % Br, 50.0. Found % 52.7. Analytical data was consistent with the assigned structure:

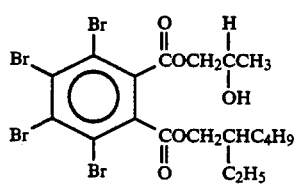

EXAMPLE 18

This compound was prepared by the procedure described in Example 13 except that stearyl alcohol was used in place of methanol. Product was a viscous liquid. Calcd. % Br, 41.0. Found % Br, 43.0. Analytical data was consistent with the assigned structure:

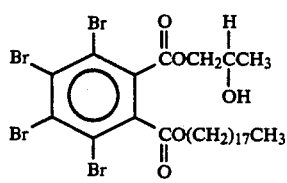

EXAMPLE 19

This compound was prepared by the procedure described in Example 13 except that 2,3-dibromopropanol-1 was used in place of methanol. Product was a viscous liquid. Calcd. % Br, 64.8. Found % Br, 61.9. Analytical data was consistent with the assigned structure:

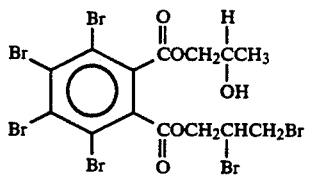

EXAMPLE 20

This compound was prepared by the procedure outlined in Example 16 except that epichlorohydrin was used in place of epoxybutane. Calcd. % Br, 35.7. Found % 35.4. Analytical data was consistent with the assigned structure:

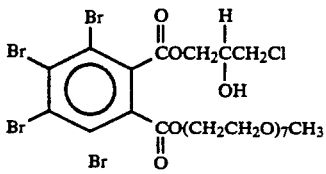

EXAMPLE 21

To a solution of methoxy "Carbowax" 350 (300.0 g, 0.89 mol) in dry toluene (184 ml) was added sodium methoxide (48.0 g, 0.90 mol) in methanol. The methanol was then distilled off at ambient pressure. Tetrabromophthalic anhydride was then added (442.2 g, 0.89 mol) along with an additional 50 ml of toluene. The reaction mixture was refluxed for 2 hours and after cooling to room temperature, epichlorohydrin (106.94 g, 1.16 mols) was added. The mixture was refluxed for 20 hours. After the solvent and excess epichlorohydrin were distilled, a viscous dark product was obtained. Calcd. % Br, 37.2. Found % Br, 40.4. Analytical data was consistent with assigned structure:

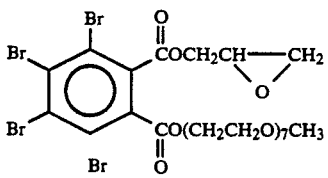

EXAMPLE 22

Methoxy "Carbowax" 350 and toluene were refluxed for 1 hour in order to distill out a small amount of water. Tetrabromophthalic anhydride (1:1 mole ratio with Methoxy "Carbowax" 350) and sodium acetate were added and the mixture refluxed for 17 hours. After cooling to room temperature, an excess of diazomethane (prepared from the decomposition of N-methyl-N-nitroso-p-toluene sulfonamide by sodium hydroxide) in ethyl ether was added and the mixture allowed to stand overnight. The excess diazomethane was decomposed by adding acetic acid and the solvent removed by distillation. Product was a viscous liquid. Calcd. % Br, 39.2. Found % Br, 37.4. Analytical data was consistent with the assigned structure:

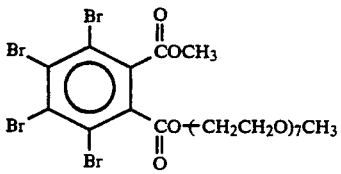

EXAMPLE 23

Poly(ethylene glycol)600, 885.4 g ( 1.40 mols), tetrabromophthalic anhydride, 1298.4 g (2.80 mols), potassiumacetate, 1.35 g, and toluene (1000 g) were charged into a one-gallon glass-lined reactor and heated to 120° C. After 4 hours at this temperature, ethylene oxide, 246.68 g (5.60 mols) was pumped into the reactor in ¾ hour while maintaining the temperature at 120° C. After one more hour of heating, the mixture was cooled to room temperature, the excess ethylene oxide was then vented, and the product collected. After stripping off the toluene, 2250 g of the product was isolated in 99% yield as a viscous liquid. Calcd. % Br, 39.2. Found % Br, 38.8. Analytical data was consistent with the assigned structure.

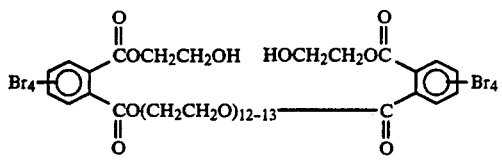

EXAMPLE 24

To the product of Example 11, 453.8 g (0.27 mol), acetic anhydride, 83.4 g (0.82 mol), potassium acetate, 1.0 g, and toluene, 400 ml, were added and the mixture refluxed for 8 hours. After cooling to room temperature, the reaction mixture was transferred to a separatory funnel and extracted first with 100 ml of a 16% potassium bicarbonate solution and then with 100 ml of water. After distilling off the solvent, 335.0 g (64% yield) of product was obtained as a viscous liquid. Calcd. % Br, 39.2. Found % Br, 38.8. Analytical data was consistent with the assigned structure:

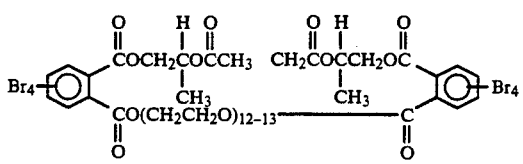

EXAMPLE 25

Tetrabromophthalic anhydride, 231.9 g (0.50 mol), 2-ethylhexanol, 130.2 g (1.0 mol), and potassium acetate, 0.24 g were heated to and kept at 120° C. for 4 hours. The mixture was cooled to 60° C. and potassium carbonate, 35.9 g (0.26 mol), was added. The mixture was reheated to 80° C. and kept at this temperature for 2 hours, then cooled to 60° C. and triethylamine, 14.2 g (0.14 mol) was added. Then the mixture was reheated to 70° C. and methyl iodide, 10 113.6 g (0.8 mol) was added over 20 minutes. The mixture was heated to 70°–75° C. and kept at this temperature for 2 hours, then cooled to room temperature and filtered in order to remove by-product potassium iodide. The filtrate was distilled to remove toluene and 290 g of crude product was collected as a pale yellow liquid. This product was extracted 3 times with 100 ml each of a 6.5% potassium carbonate solution followed by 2 times with 100 ml each of water and once with a 30% sodium chloride solution. The organic phase was dried over anhydrous magnesium sulfate overnight.. The magnesium sulfate was filtered off and after removing the solvent from filtrate by distillation, 204 g of product was obtained in 67% yield as a pale yellow liquid. Calcd. % Br, 52.6. Found % Br, 52.2. Analytical data was consistent with the assigned structure:

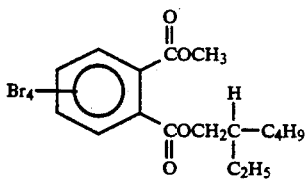

EXAMPLE 26

Tetrabromophthalic anhydride, 231.9 gm (0.5 mol), 2-(2-methoxyethoxy)-ethanol, 360.5 gm (3.0 mols), stannous oxalate, 2.32 gm, 0.2 gm KOAc and xylene, 100 ml were mixed and refluxed (temp. 171° C.) for 73 hours, during which time the water of the reaction was collected. Then 150 ml of toluene were added to the reaction mixture, which was then washed with a 15% NaCl solution. The organic phase was dried with anhydrous magnesium sulfate overnight. After removing the magnesium sulfate by filtration, toluene and xylene were removed by distillation to give 246.6 gm of yellow liquid product in 72% yield. Calcd. % Br, 46.6. Found % Br, 46.9. Analytical data was consistent with the assigned structure:

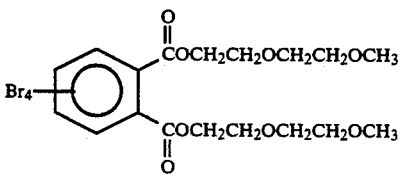

EXAMPLE 27 (THEORETICAL)

This compound may be prepared by the procedure outlined in Example 26 except using 2-(2-ethoxyethoxy)-ethanol in place of 2-(2-methoxyethoxy)-ethanol.

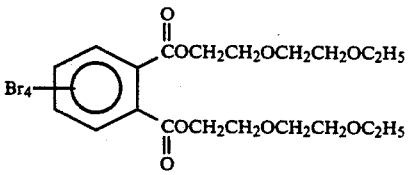

EXAMPLE 28

This compound was prepared by the procedure outlined in Example 23 except that docosyl alcohol (behenyl alcohol) was used in place of poly(ethylene glycol) 600 and propylene oxide in place of ethylene oxide. The product was a viscous liquid. Calcd. % Br, 37.7. Found % Br, 36.5. Analytical data was consistent with the assigned structure:

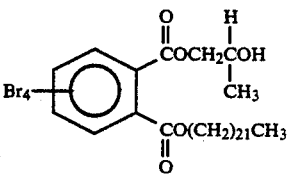

EXAMPLE 29 (THEORETICAL)

This compound may be prepared by the procedure outlined in Example 23 except that tricontyl alcohol can be used in place of poly(ethylene glycol) 600 and propylene oxide in place of ethylene oxide. The product would be a viscous liquid.

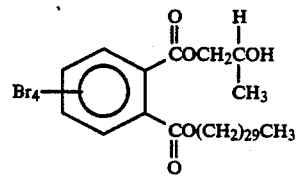

EXAMPLE 30 (THEORETICAL)

This compound may be prepared by the procedure outlined in Example 26 except using methoxy "Carbowax" 550 in place of 2-[2-methoxyethoxy]-ethanol.

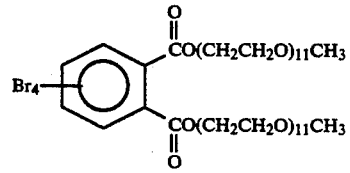

EXAMPLE 31

Into a one liter three-necked flask, equipped with an overhead mechanical stirrer, a Dean Stark trap, a water condenser with a nitrogen inlet and a thermometer were charged 231.86 gm (0.50 mol) of tetrabromophthalic anhydride, 390.7 gm (3.0 mols) of 2-ethyl-1-hexanol, and 2.32 gm of stannous oxalate. The flask and contents were stirred and heated to reflux (195° C.) and 9 ml of water (100% of theory) were obtained in 22 hours. The contents were cooled to room temperature, filtered to remove the catalyst, and the excess of alcohol was removed by vacuum distillation to give 350 gm of a light yellow oil. The yield was 97%. Calcd. % Br 45.3, Found % Br, 44.9. Analytical data was consistent with the assigned structure. High pressure liquid chromatography (HPLC) of the product showed it to be 96.2% pure with only a minor amount of by-product (3.3%) due to decarboxylation of the intermediate half-ester. This contrasts with the results obtained by Spatz, et al.,[I & EC Products Res. and Dev., 8: 391 (1969), at p. 2, last paragraph].

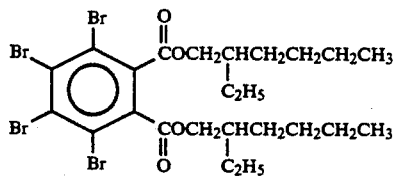

EXAMPLE 32

Following the procedure outlined in Example 31 using 6955.8 gm (15.0 mols) of tetrabromophthalic anhydride, 11.72 kg (90.15 mols) 2-ethyl-1-hexanol, and 69.55 gm of stannous oxalate, resulted in 10.5 kg (99% yield) of di-2-ethylhexyl tetrabromophthalate. Calcd. %

Br 45.3, Found % Br 43.5. Analytical data was consistent with the assigned structure. High pressure liquid chromatography (HPLC) of the product showed it to be 97.1% pure with only a minor amount of by-product (2.8%) due to decarboxylation of the intermediate half-ester.

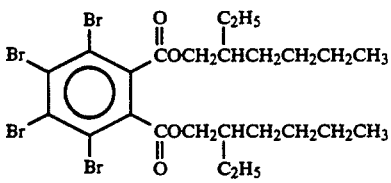

EXAMPLE 33 (THEORETICAL)

This compound may be prepared following the procedure outlined in Example 31 except using 1-dodecanol instead of 2-ethyl-1-hexanol.

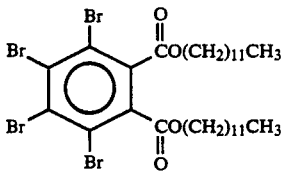

EXAMPLE 34

Into a two liter three-necked flask, equipped with an overhead mechanical stirrer, Dean Stark trap, a water condenser with a nitrogen inlet tube and a thermometer, were charged 463.7 gm (1.0 mol) of tetrabromophthalic anhydride, 442.7 gm (3.4 mols) of 1-octanol and 4.6 gm of stannous oxalate. The flask and contents were heated to reflux (210° C.) and 22.5 gm of a water phase were collected in 7 hours. The excess 1-octanol was removed on a rotary evaporator to give 696 gm of a dark oil. The yield was 98.6%.

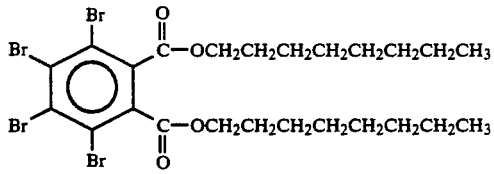

EXAMPLE 35 (THEORETICAL)

This compound may be prepared following the procedure in Example 31 except using isononyl alcohol instead of 2-ethyl-1-hexanol.

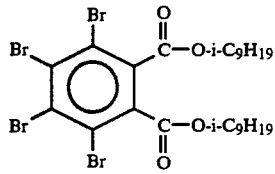

EXAMPLE 36 (THEORETICAL)

This compound may be prepared by the procedure outlined in Example 26 except using isodecyl alcohol in place of 2-(2-methoxyethoxy)-ethanol.

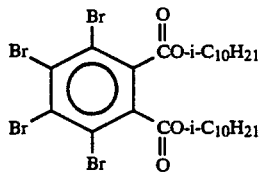

EXAMPLE 37 (THEORETICAL)

This compound may be prepared following the procedure outlined in Example 31 except using n-butyl alcohol instead of 2-ethyl-1-hexanol and using butyl stannoic acid as catalyst instead of stannous oxalate.

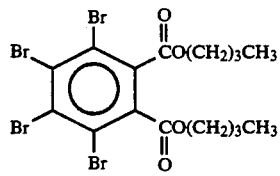

EXAMPLE 38 (THEORETICAL)

This compound may be prepared following the procedure outlined in Example 31 except using 1-octadecanol instead of 2-ethyl-1-hexanol.

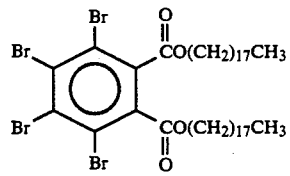

EXAMPLE 39

Into a one liter three-necked flask, equipped with an overhead mechanical stirrer, Dean Stark trap, a water condenser with a nitrogen inlet tube and a thermometer, were charged 285.9 gm (1.0 mol) of tetrachlorophthalic anhydride, 442.7 gm (3.4 mol) of 2-ethyl-1-hexanol and 6.5 gm of titanium tetrakisisopropoxide. The flask and contents were heated to reflux (200° C.) and 23 gm of a water phase were collected in 2 hours. The excess 2-ethyl-2-hexanol was removed on a rotary evaporator to give 528 gm of an oil. The yield was quantitative.

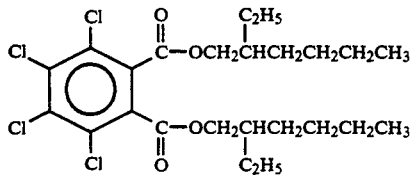

EXAMPLE 40 (THEORETICAL)

This compound may be prepared following the procedure outlined in Example 31 except using cyclohexanol instead of 2-ethyl-1-hexanol.

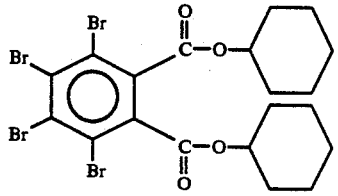

EXAMPLE 41 (THEORETICAL)

This compound may be prepared following the procedure outlined in Example 31 except using tribromophthalic anhydride instead of tetrabromophthalic anhydride.

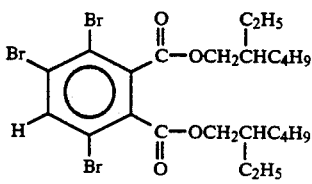

EXAMPLE 42 (THEORETICAL)

This compound may be prepared following the procedure outlined in Example 31 except using 1,12-dodecanediol instead of 2-ethyl-1-hexanol and dibutyltin dilaurate instead of stannous oxalate.

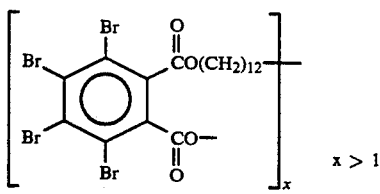

EXAMPLE 43

Into a two liter three-necked flask, equipped with an overhead mechanical stirrer, Dean Stark trap, a water condenser with a nitrogen inlet tube and a thermometer, were charged 927.5 gm (2 mols) of tetrabromophthalic anhydride, 780 gm (6 mols) of 2-ethyl-1-hexanol and 9.27 gm of titanium tetrabutoxide. The flask and contents were heated to reflux 185° C. at 560 mm pressure and 73 gm of a water phase were collected in 10 hours. The excess 2-ethyl-1-hexanol was removed on a rotary evaporator to give 1350 gm of oil. The yield is 96%. Analytical data was consistent with the assigned structure.

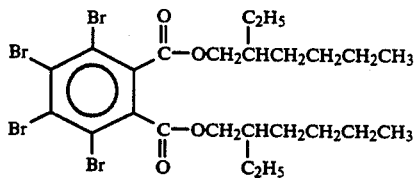

EXAMPLE 44 (THEORETICAL)

This compound may be prepared following the procedure outlined in Example 31 except using 2,4,5,6,-tetrabromoisophthalic acid instead of tetrabromophthalic anhydride.

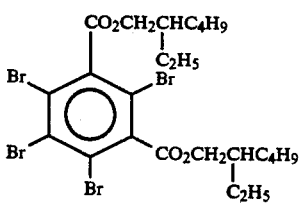

EXAMPLE 45 (THEORETICAL)

This compound may be prepared following the procedure outlined in Example 31 except replacing three-fourths of the 2-ethyl-1-hexanol by an equimolar quantity of 1-butanol and refluxing the 2-ethyl-1-hexanol for 2-3 hours prior to the addition of the remaining alcohol.

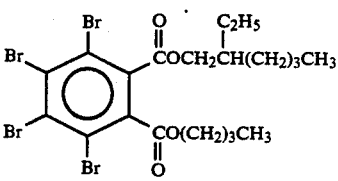

EXAMPLE 46 (THEORETICAL)

This compound may be prepared following the procedure outlined in Example 45 except using 1-hexanol instead of 2-ethyl-1-hexanol and 2-ethoxyethoxyethanol instead of 1-butanol.

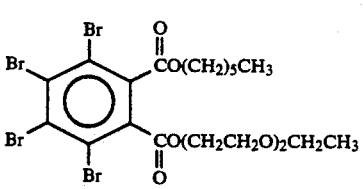

EXAMPLE 47 (THEORETICAL)

This compound may be prepared following the procedure outlined in Example 45 except using cyclohexanol instead of 1-butanol.

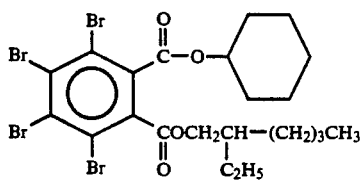

EXAMPLE 48 (THEORETICAL)

This compound may be prepared following the procedure outlined in Example 44 except using 1-decanol instead of 2-ethyl-1-hexanol, tetrachlorophthalic anhydride in place of tetrabromophthalic anhydride, and butylstannoic acid as the catalyst instead of stannous oxalate.

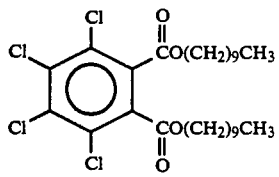

EXAMPLE 49

Into a one liter three-necked flask, equipped with an overhead mechanical stirrer, Dean Stark trap, a water condenser with a nitrogen inlet tube and a thermometer, were charged 285.9 gm (1.0 mol) of tetrachlorophthalic anhydride, 442.7 gm (3.4 mols) of 1-octanol and 3.0 gm of butylstannoic anhydride. The flask and contents were heated to reflux (216° C.) and 18.8 gm of a water phase were collected in 2 hours. The excess 1-octanol was removed on a rotary evaporator to give 522 gm of an oil. The yield was 99%.

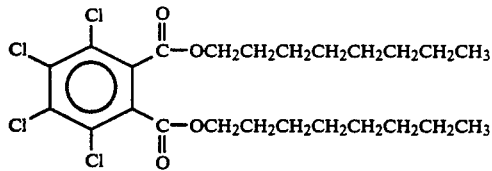

EXAMPLE 50

Into a one liter three-necked flask, equipped with an overhead mechanical stirrer, Dean Stark trap, a water condenser with a nitrogen inlet tube and a thermometer, were charged 285.9 gm (1.0 mol) of tetrachlorophthalic anhydride, 442.7 gm (3.4 mols) of 2-ethyl-1-hexanol and 3.3 gm of stannous oxalate. The flask and contents were heated to reflux (200° C.) and 19.8 gm of a water phase were collected in 3 hours. The excess 2-ethyl-1-hexanol was removed on a rotary evaporator to give 508 gm of a light colored oil. The yield was 96.2%.

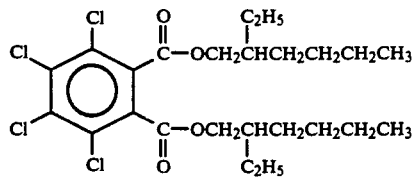

EXAMPLE 51

Into a one liter three-necked flask, equipped with an overhead mechanical stirrer, Dean Stark trap, a water condenser with a nitrogen inlet tube and a thermometer, were charged 285.9 gm (1.0 mol) of tetrachlorophthalic anhydride, 442.7 gm (3.4 mols) of 2-ethyl-1-hexanol and 3.3 gm butylstannoic anhydride. The flask and contents were heated to reflux (200° C.) and 20 gm of a water phase were collected in 2 hours. The excess 2-ethyl-1-hexanol wag removed on a rotary evaporator to give 527 gm of a light colored oil. The yield was quantitative.

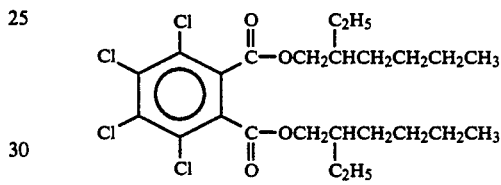

EXAMPLE 52

Into a two liter three-necked flask, equipped with an overhead mechanical stirrer, Dean Stark trap, a water condenser with a nitrogen inlet tube and a thermometer, were charged 572 gm (2.0 mols) of tetrachlorophthalic anhydride, 885 gm (6.8 mols) of 2-ethyl-1-hexanol and 6.6 gm of stannous oxalate. The flask and contents were heated to reflux (196° C.) and 40.0 gm of a water phase were collected in 6 hours. The excess 2-ethyl-1-hexanol was removed on a rotary evaporator to give 952 gm of a light colored oil. The yield was 90%.

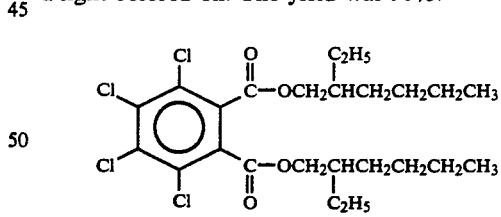

EXAMPLE 53

Into a two liter three-necked flask, equipped with an overhead mechanical stirrer, Dean Stark trap, a water condenser with a nitrogen inlet tube and a thermometer, were charged 285.9 gm (1.0 mol) of tetrachlorophthalic anhydride, 408 gm (4.0 mol) of of 2-ethyl-1-butanol, 347.5 gm of tetrahydronaphthalene and 3.3 gm of stannous oxalate. The flask and contents were heated to reflux (178° C.) and 19.0 gm of water phase were collected in hours. The excess 2-ethyl-1-butanol and tetrahydronaphthalene were removed on a rotary evaporator to give 474 gm of an oil. The yield was quantitative.

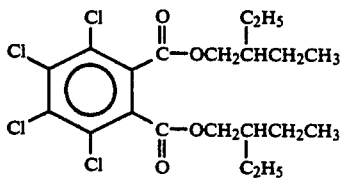

EXAMPLE 54

Into a two liter three-necked flask, equipped with an overhead mechanical stirrer, Dean Stark trap, a water condenser with a nitrogen inlet tube and a thermometer, were charged 463.7 gm (1.0 mol) of tetrabromophthalic anhydride, 408 gm (4.0 mol) of 2-ethyl-1-butanol, 450 gm of tetrahydronaphthalene and 4.64 gm of butylstannoic anhydride. The flask and contents were heated to reflux (170° C.) and 20 gm of a water phase were collected in 9 hours. The excess 2-ethyl-1-butanol and tetrahydronaphthalene were removed on a rotary evaporator to give 624 gm of a light yellow oil. The yield was 96%.

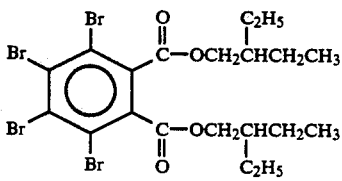

EXAMPLE 55

Into a two liter three-necked flask, equipped with an overhead mechanical stirrer, Dean Stark trap, a water condenser with a nitrogen inlet tube and a thermometer, were charged 285.9 gm (1.0 mol) of tetrachlorophthalic anhydride, 347.5 gm (3.4 mol) of 1-hexanol; 300 gm of tetrahydronaphthalene and 3.0 of butylstannoic anhydride. The flask and contents were heated to reflux (180° C.) and 18.0 gm of a water phase were collected in 4 hours. The excess 1-hexanol and tetrahydronaphthalene were removed on a rotary evaporator to give 466 gm of an oil. The yield was 99%.

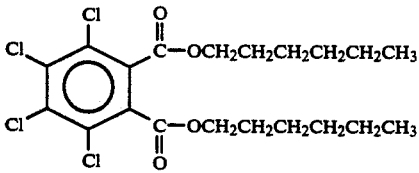

EXAMPLE 56

Into a two liter three-necked flask, equipped with an overhead mechanical stirrer, Dean Stark trap, a water condenser nitrogen inlet tube and a thermometer, were charged 463.7 gm (1.0 mol) of tetrabromophthalic anhydride, 347.5 gm(3.4 mol) of 1-hexanol, 300 gm of tetrahydronaphthalene and 6.6 gm of butylstannoic anhydride. The flask and contents were heated to reflux (180° C.) and 21.6 gm of a water phase were collected in 6.5 hours. The excess 1-hexanol and tetrahydronaphthalene were removed on a rotary evaporator to give 623 gm of an oil. The yield was 96%.

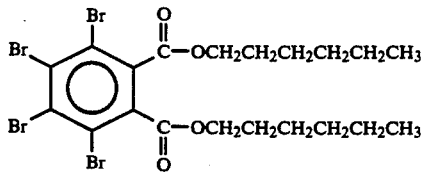

EXAMPLE 57 (THEORETICAL)

This compound may be prepared following the procedure outlined in Example 31 except using 2,3,5,6,-tetrabromoterephthalic acid instead of tetrabromophthalic anhydride.

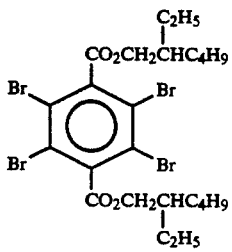

EXAMPLE 58

A mixture of 75.3 g of omega-methylhepta (oxyethylene)-2-hydroxypropyl tetrabromophthalate containing 2.2% hydroxyl, 45.16 g (0.10 mol) tetrabromophthalic anhydride, and 50 mg potassium acetate, was heated at 125° C. for 5.5 hours. After cooling to room temperature, 11.27 g (0.18 mol) of propylene oxide was added, and the mixture was reheated to 85° C. and kept at this temperature for 3 hours. The excess propyleneoxide was removed by distillation to give a colorless, opalescent, viscous liquid in essentially quantitative yield. Calcd. % Br, 46.1. Found % Br, 46.7. Analytical data was consistent with the following assigned structure:

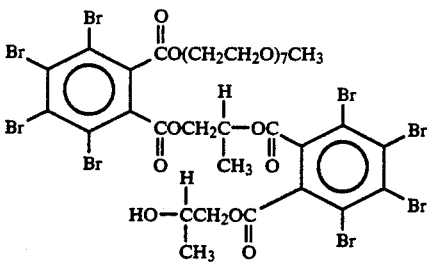

EXAMPLE 59

A mixture of 129.25 g (0.25 mol) Methoxy "Carbowax" 550 (M.W. 550), 231.86 g (0.50 mol) tetrabromophthalic anhydride, 0.24 g potassium acetate and 250 ml toluene were refluxed for 6 hours. After cooling to 50°-60° C., 70.58 g (1.2 mols) of propylene oxide was added in 15 minutes. The mixture was heated to 85° C. and kept at this temperature for 6 hours. After filtration, the solvent and excess of propylene oxide were removed by distillation to give the product as an opalescent, viscous liquid in essentially quantitative yield. Calcd. % Br, 41.0. Found % Br, 40.9. Analytical data was consistent with the following assigned structure:

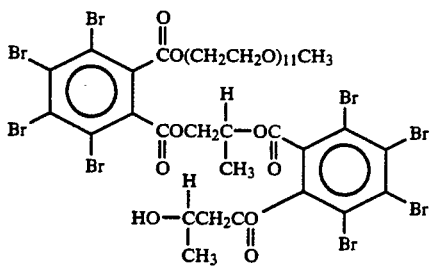

EXAMPLE 60

The compound below was prepared by the procedure outlined in Example 59 except that Methoxy "Carbowax" 750 (M.W. 750) was used in place of Methoxy "Carbowax" 550. The product was a slightly yellow, viscous liquid. Calcd. % Br, 36.7. Found % Br, 36.5. Analytical data was consistent with the following assigned structure:

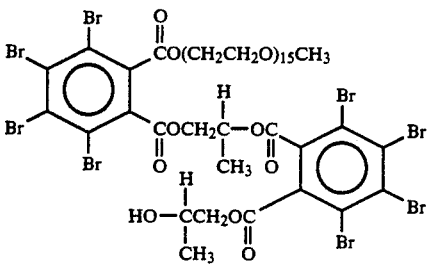

EXAMPLE 61

The compound below was prepared by the procedure outlined in Example 59 except that epichlorohydrin was used in place of propylene oxide. The product was a slightly yellow, opalescent, viscous liquid. Calcd. % Br, 39.2; % Cl, 4.35. Found % Br, 39.1; % Cl, 4.40. Analytical data was consistent with the following assigned structure:

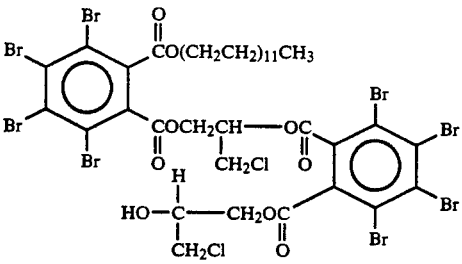

EXAMPLE 62

Into a 1-gallon, stainless steel, stirred autoclave, were charged: 855.4 g (1.40 mols) of poly(ethylene glycol 600); 1623.0 g (3.51 mols) of tetrabromophthalic anhydride; 1.7 g (3.5 mols) of potassium acetate, and 1000 ml of toluene. The mixture was heated to and kept at 120° C. for 6 hours. 328.3 g (7 mols) of ethylene oxide was pumped into the mixture in 45 minutes. Heating continued for 2 hours. After cooling to room temperature, the reaction mixture was collected, and the solvent was removed by distillation to give the product in essentially quantitative yield. The product was a light yellow, viscous liquid. Calcd. % Br,42.5. Found % Br, 43.0. Analytical data was consistent with the following assigned structure:

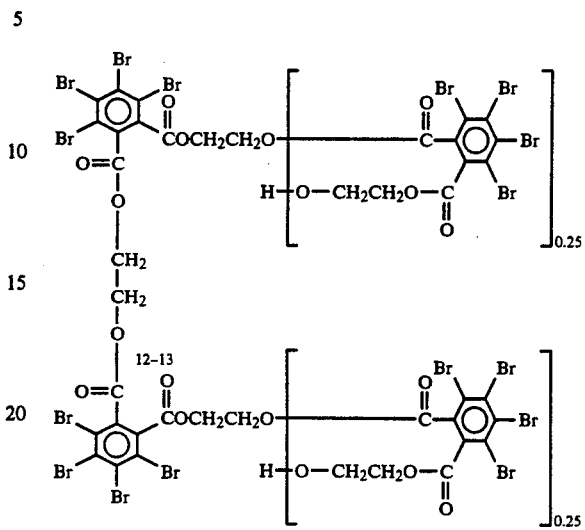

EXAMPLE 63

The compound below was prepared by the procedure outlined in Example 62 except that 3 mols of tetrabromophthalic anhydride and 6 mols of ethylene oxide were used per mol of poly(ethylene glycol)600. The product was a light yellow, viscous liquid. Calcd. % Br, 44.9. Found % Br, 44.6. Analytical data was consistent with the following assigned structure:

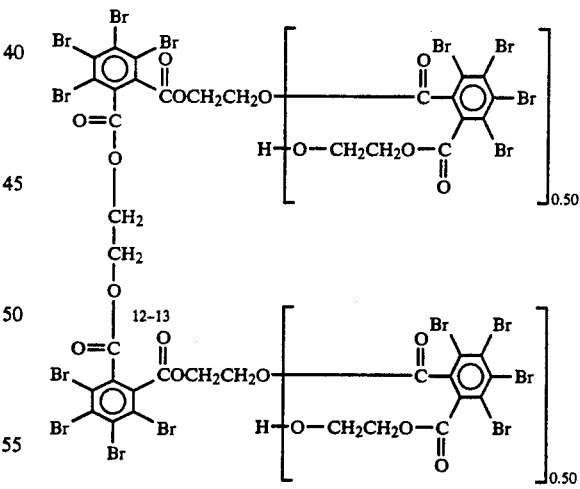

EXAMPLE 64

The compound below was prepared by the procedure outlined in Example 62 except that 4 mols of tetrabromophthalic anhydride and 8 mols of ethylene oxide were used per mol of poly(ethylene glycol)600. The product was a yellow, highly viscous liquid. Calcd. % Br, 48.4. Found % Br, 49.9. Analytical data was consistent with the following assigned structure:

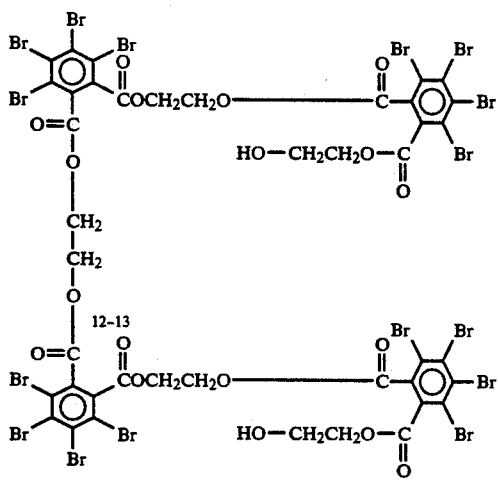

EXAMPLE 65

The compound below was prepared by the procedure outlined in Example 64 except that propylene oxide was used in place of ethylene oxide. The product was a yellow, highly viscous liquid. Calcd. % Br, 47.4. Found % Br, 46.3. Analytical data was consistent with the following assigned structure:

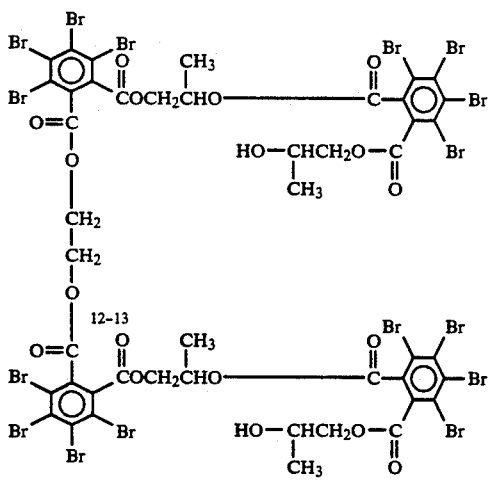

EXAMPLE 66

The compound below was prepared by the procedure outlined in Example 64 except that octadecyl alcohol was used in place of poly(ethylene glycol)600. The product was a yellow, highly viscous liquid. Calcd. % Br, 48.6. Found % Br, 46.5. Analytical data was consistent with the following assigned structure:

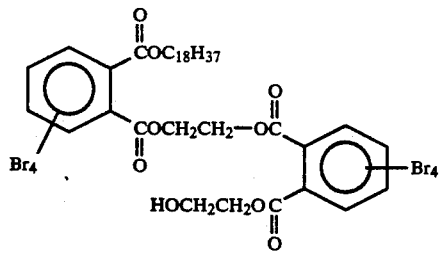

EXAMPLE 67

A mixture of 251.7 g (containing 1.52% hydroxy groups) of the product of Example 64 and 250 ml of toluene was warmed to 50° C. until the reactant dissolved. After cooling to room temperature, 18.55 g (0.2 mol) of acetyl chloride was added in one portion, and then 25.1 g (0.25 mol) of triethylamine was added in 10 minutes. During this period the temperature of the reaction mixture rose from 23° C. to 62° C. The mixture was heated to reflux and kept there for four hours. After filtering the reaction mixture, the solvent was removed to give a dark red-yellow, viscous liquid in 92% yield. Calcd. % Br, 46.9. Found % Br, 47.1. Analytical data was consistent with the following assigned structure:

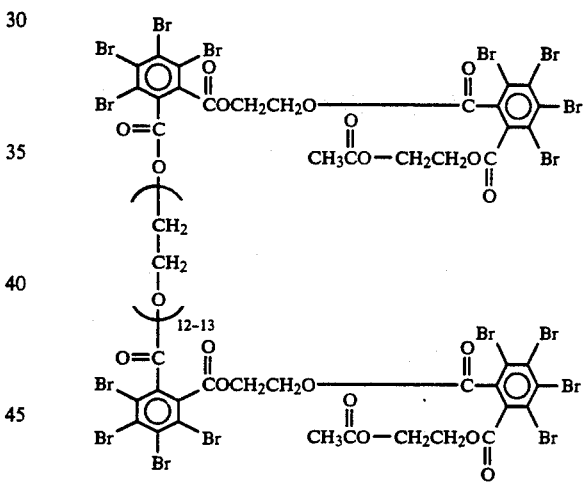

EXAMPLE 68

The compound below was prepared by the procedure outlined in Example 65 except that behenyl alcohol was used in place of poly(ethylene glycol)600. The product was a highly viscous liquid. Calcd. % Br, 46.6. Found % Br, 45.9. Analytical data was consistent with the following assigned structure:

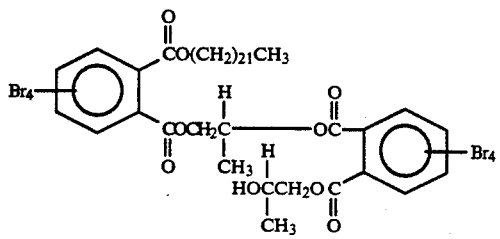

Demonstration of Fire Resistance

EXAMPLES 69 TO 72

In the following examples, the fire resistant characteristics of the hydraulic fluid compositions of this invention are demonstrated. Those compositions of Examples 71 and 72 which contain more than one component were prepared by simply stirring the ingredients together. All percentages are by weight.

DEHTBP = Di-(2-ethylhexyl) Tetrabromophthalate (an inventive ester)

TCP = Tricresyl Phosphate ["Durad" 124, a trademark of FMC Corp.]

TBPP = tert-Butyl Phenyl Phosphate ["Durad" 220B, a trademark of FMC Corp.]

TABLE I

| Ingredient | Example 69 (comparison) | 70 | 71 | 72 |
|---|---|---|---|---|
| DEHTBP | — | 100.00 | 65.0 | 50.0 |
| TCP | — | — | 35.0 | — |
| TBPP | 100.0 | — | — | 50.0 |

TABLE II

| Test (°F./°C.) | Example 69 (comparison) | 70 | 71 | 72 |
|---|---|---|---|---|
| Autoignition | 1,000/5-40 | 842/450 | 851/456 | 788/423 |
| Fire Point [Cleveland Open Cup-A.S.T.M. D-92] | 550/288 | 545/285 | 600/316 | 625/332 |
| Flash Point [Cleveland Open Cup-A.S.T.M. D-92] | 460/238 | 500/260 | — | — |
| Flash Point [Pensky-Marten Closed Cup-ASTM D-93] | — | — | 415/213 | 485/252 |
| Pour Point [ASTM D-97] | −5/−20.5 | −11/−24 | −15/−26 | −4/−20 |
| Viscosity (kinematic, CS) | | | | |
| at 100° F./38° C. | 45 | 351 | 97 | 112 |
| at 212° F./100° C. | — | 15.8 | 7.1 | 7.7 |
| at 210° F./99° C. | 5.3 | — | — | — |
| Specific Gravity | 1.155 | 1.545 | 1.388 | 1.298 |
| 4-Ball Wear [ASTM D-4172] | | | | |
| 1) Scar (mm.) | 0.60 | 0.88 | 1.16 | 1.08 |
| 2) Coeff. of friction | 0.06 | 0.02 | 0.07 | 0.06 |
| 3) Weld Point | — | — | 200 | 160 |
| Cu Corrosion [ASTM D-130] | 1b | 1a | 1a | — |
| Ramsbottom Carbon Residue (%) [ASTM D-524] | — | 0.8 | 2.145 | 0.804 |
| Wick Ingition Cycles [Federal Std. 291-352; MIL-H83282B] | — | — | 100+ | 100+ |

The above results clearly demonstrate the fire resistant characteristic of the compositions of this invention as evidenced by the high autoignition temperatures, firepoints, and flash points of compositions 70, 71, and 72. Further, the flash and fire points of these compositions are at least comparable to the known commercial fire resistant hydraulic fluid (Example 69) and in several instances higher. Additionally, the flame resistant nature of the compositions of this invention (Examples 71 and 72) is shown by the wick ignition test in which a wick is saturated with a liquid and then passed through a flame in windshield wiper fashion for a number of cycles. As shown by the data, the wicks saturated with the compositions 71 and 72 did not ignite even after 100 cycles through a flame, the limit of the test. Compositions 70, 71, and 72 of this invention also show comparable lubricating properties to the commercial hydraulic fluid (Example 69) as shown by an at least comparable and in one case lower coefficient of friction.

In the following examples, the fire resistant characteristics of the hydraulic fluid compositions containing a shear-stable polymer are demonstrated. The compositions incorporating the shear-stable polymer were heated to a temperature between 140°-180° F. while mixing. The control examples, Examples 73 and 74, were mixed under ambient conditions. All percentages are by weight.

DEHTBP = Di-(2-ethylhexyl)Tetrabromophthalate

PMAE = Polymethacrylate ester (ACRYLOID ® 704, Rohm & Hass Co.)

SBCP = Styrene-butadiene copolymer (Lubrizol ® 7443, Lubrizol Corp.)

POE = Neopentylglycol dioleate (HATCOL ® 4322, Hatco Corp.) and/or trimethylolpropane trioleate (HATCOL ® 4323, Hatco Corp.), according to the viscosity required.

HITEC = Hitec ® M-9191; Ethyl Corp. (proprietary blend of additives for imparting antiwear, antioxidant and anticorrosion properties to hydraulic fluids)

FMR = Factory Mutual Research Test Method 6930, Less Hazardous Hydraulic Fluids. This test measured the self-extinguishing properties of the composition mist ignited by a propane flame positioned at six and eighteen inches from the spray nozzle. Ten runs of the composition were conducted at each distance. The reported FMR results show the percent of the total runs at both distances that burned for less than six seconds after ignition. In order for a composition to pass FMR Test Method 6930, none of the ten runs at each distance can burn for six seconds or longer.

TABLE III

| Ingredient | Example (% of Composition) | | | | | | |
|---|---|---|---|---|---|---|---|
| | 73 | 74 | 75 | 76 | 77 | 78 | 79 |
| POE | 75 | 75 | 72 | 72 | 70 | 76.9 | 77.4 |
| DEHTBP | 25 | 25 | 25 | 25 | 25 | 20.0 | 20.0 |
| HITEC | 0 | 0 | 0 | 0 | 0 | 1.1 | 1.1 |
| PMAE | 0 | 0 | 3 | 3 | 5 | 0 | 0 |
| SBCP | 0 | 0 | 0 | 0 | 0 | 2.0 | 1.5 |
| FMR | 25 | 53 | 100 | 95 | 100 | 95 | 85 |

The above results demonstrate that the shear-stable polymer significantly increases the fire resistance of the hydraulic fluid compositions. In Control Examples 73 and 74 (without the shear-stable polymer) 25 and 53 percent, respectively, of test runs burned for six seconds or longer. However, when the shear-stable polymer was added, Examples 75 and 77 pass the FMR Test Method 6930 since no sample run burned for six seconds or longer.

We claim:

1. A hydraulic fluid composition comprising a fire-resistant imparting or improving effective amount of a halophthalate ester of the formula:

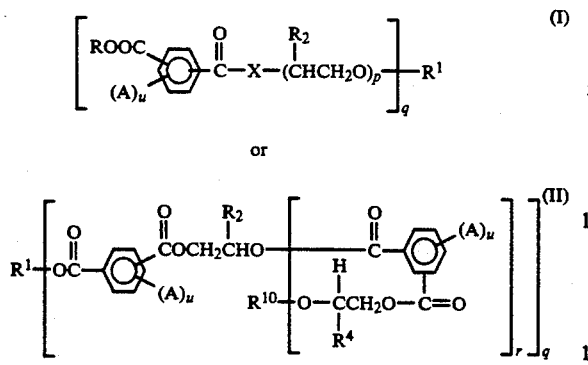 (I)

or

 (II)

wherein:
(a) the rings can have all possible arrangements;
(b) R is substituted or unsubstituted $C_{1-30}$ alkyl, hydroxy $C_{2-20}$ alkyl, polyhydroxy $C_{3-10}$-alkyl, or

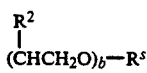

where $R^2$ and $R^8$ are as defined below, and b is 1 to 50;
(c) $R^1$ is H, branched or linear substituted or unsubstituted $C_{1-30}$ alkyl or unsaturated $C_{2-22}$ alkyl, or

and $R^7$ is as defined below,
(d) $R^2$ is, independently, H or $CH_3$;
(e) $R^3$ and $R^4$ are, independently, H, $C_{1-18}$ alkyl, halogen substituted $C_{1-18}$ alkyl, —OH, —$OR^5$, or

(f) $R^5$ is $C_{1-22}$ alkyl;
(g) $R^6$ is H or $C_{1-22}$ alkyl;
(h) $R^7$ is $C_{1-18}$ alkyl, polyhydroxy $C_{3-12}$ alkyl,

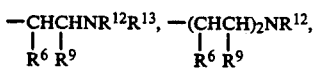

or —$(CHCN)_3N$;
(i) $R^8$ is branched or linear substituted or unsubstituted $C_{1-18}$ alkyl;
(j) $R^9$ is H or $C_{1-22}$ alkyl;
(k) $R^{10}$ is H,

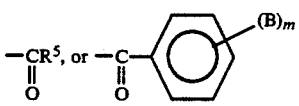

where B and m are defined below;
(l) $R^{12}$ is H or $C_{1-22}$ alkyl;
(m) $R^{13}$ is H or $C_{1-22}$ alkyl;
(n) A is Cl or Br;
(o) B is halogen, $OR^5$, or

—$COR^5$;

(p) X is O or NH;
(q) m is 1 to 5;
(r) p is 0 or an integer of 1 to 50;
(s) q is an integer of 1 to 6;
(t) r is from more than 0.1 to 50; and
(u) is 1 to 4
wherein the hydraulic fluid is one or more of:
(A) mineral oils;
(B) poly-α-olefins;
(E) esters of dibasic acids;
(G) polyol esters;
(J) organohalides other than esters of a halogen substituted aromatic acid.

2. The composition according to claim 1 wherein the halophthalate ester has the formula (II) and:
$R^3$ and $R^4$ are, independently, H, —$CH_3$, or —$CH_2Cl$;
u is 4;
q is 1; and
r is 0.25-2.

3. The composition of claim 1 or 2 further comprising one or more shear-stable polymers.

4. The composition of claim 3 wherein the one or more shear-stable polymers are selected from the group consisting of: polymers of acrylate esters; polymers of methacrylate esters; liquid $C_{4-12}$ polyolefins; styrene-butadiene copolymers; polyoxyalkylene glycols ethers; polyesters formed by reacting a dibasic carboxylic acid with a glycol; copolymers of ethylene and propylene; and copolymers of styrene and $C_2$-$C_4$ olefins.

5. The composition of claim 4 wherein the shear-stable polymers have shear stability indices below 25.

6. The composition of claim 5 wherein the shear-stable polymers have shear stability indices below 15.

7. The composition of claim 4 wherein the one or more shear-stable polymers are selected from the group consisting of: polymethacrylate esters; polybutenes having a molecular weight less than 10,000; poly (1-decene) having a viscosity greater than 25 centistokes at 100° C.; styrene-butadiene copolymers; polyoxyalkylene glycol ethers; and polyesters formed by reacting a dibasic carboxylic acid with a glycol.

8. The composition of claim 7 wherein the one or more shear-stable polymers comprise at least 2.0 wt. % of the total weight.

9. A method for imparting or improving fire resistant properties of one or more hydraulic fluids comprising adding to said fluid(s) a fire resistant imparting or improving amount of at least one fire resistant halophthalate ester wherein the halophthate ester is a compound of the formula

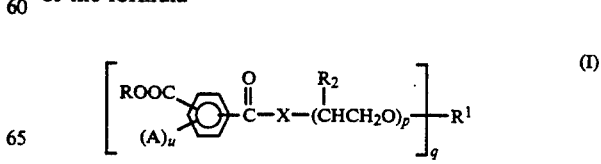 (I)

or

-continued

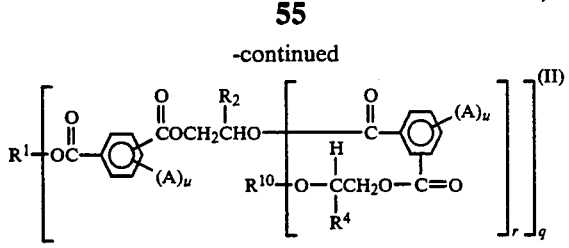

wherein:
(a) the rings can have all possible isomeric arrangements;
(b) R is substituted or unsubstituted $C_{1\text{-}30}$ alkyl, hydroxy, $C_{2\text{-}20}$ alkyl, polyhydroxy $C_{3\text{-}10}$ alkyl, or

wherein $R^2$ and $R^3$ are as defined below, and b is 1 to 50;
(c) $R^1$ is H, branched, or linear substituted or unsubstituted $C_{1\text{-}30}$ alkyl or unsaturated $C_{2\text{-}22}$ alkyl, or

and $R^7$ is as defined below,
(d) $R^2$, independently, is H or $CH_3$;
(e) $R^3$ and $R^4$ are, independently, H, $C_{1\text{-}18}$ alkyl, halogen substituted $C_{1\text{-}18}$ alkyl, —OH, —$OR^5$, or

(f) $R^5$ is $C_{1\text{-}22}$ alkyl;
(g) $R^6$ is H or $C_{1\text{-}22}$ alkyl;
(h) $R^7$ is $C_{1\text{-}18}$ alkyl, polyhydroxy $C_{3\text{-}12}$ alkyl,

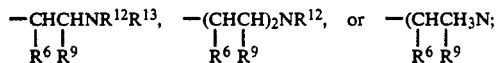

(i) $R^8$ is branched or linear substituted or unsubstituted $C_{1\text{-}18}$ alkyl;
(j) $R^9$ is H or $C_{1\text{-}22}$ alkyl;
(k) $R^{10}$ is H, —$CR^5$, or

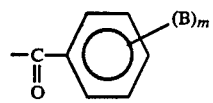

where B and m are defined below:
(l) $R^{12}$ is H or $C_{1\text{-}22}$ alkyl;
(m) $R^{13}$ is H or $C_{1\text{-}22}$ alkyl;
(n) A is Cl or Br;
(o) B is halogen, $OR^5$, or

(p) X is O or NH;
(q) m is 1 to 5;
(r) p is 0 or an integer of 1 to 50;

(s) q is an integer of 1 to 6;
(t) r is from more than 0.1 to 50; and
(u) u is 1 to 4.

10. The method of claim 9 wherein the ester has the formula II and:
$R^3$ and $R^4$ are, independently, H, —$CH_3$, or —$CH_2Cl$;
u is 4;
q is 1; and
r is 0.25–2.

11. The method of claim 10 further comprising the addition of one or more shear-stable polymers to the hydraulic fluid.

12. The method of claim 11 wherein the one or more shear-stable polymers are selected from the group consisting of: polymers of acrylate esters; polymer of methacrylate esters; liquid $C_4$–$C_{12}$ polyolefins; styrene-butadiene copolymers; polyoxyalkylene glycols; polyoxyalkylene glycol ethers; polyesters formed by reacting a dibasic carboxylic acid with a glycol; copolymers of ethylene and propylene; and copolymers of styrene and $C_2$–$C_4$ olefins.

13. The method of claim 12 wherein the shear-stable polymers have shear stability indices below 25.

14. The method of claim 13 wherein the shear-stable polymers have shear stability indices below 15.

15. The method of claim 11 wherein the one or more shear-stable polymers are selected from the group consisting of polymethacrylate esters; polybutenes having a molecular weight less than 10,000; poly(1-decene) having a viscosity greater than 25 centistokes at 100° C.; styrene-butadiene copolymers; polyoxyalkylene glycol ethers; and polyesters formed by reacting a dibasic carboxylic acid with a glycol.

16. The method of claim 15 wherein the one or more shear-stable polymers comprise at least 2.0 wt. % of the total weight.

17. The method of claim 9 where the halphthalate ester is formula (I) and
R is

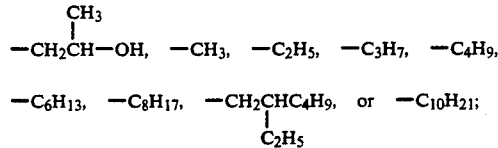

$R^1$ is —$CH_3$, —$C_2H_5$, —$C_4H_9$, H, —$C_3H_7$, —$C_6H_{13}$, —$C_8H_{17}$,

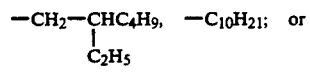

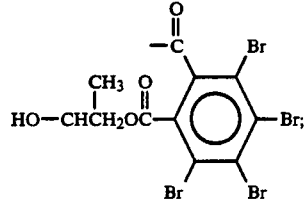

and
q=1.

18. The method of claim 17 further comprising the addition of one or more shear-stable polymers.

19. The method of claim 19 wherein one or more of shear-stable polymers are selected from the group consisting of:

polymers of acrylate esters; polymers of methacrylate esters; liquid C4–12 polyolefins; styrene-butadiene copolymers; polyoxyalkylene glycols; polyoxyalkylene glycol ethers; polyesters formed by reacting a dibasic carboxylic acid with a glycol; copolymers of ethylene and propylene; and copolymers of styrene and C2–4 olefins.

20. The method of claim 19 wherein the shear-stable polymers have shear stability indices below 25.

21. The method of claim 20 wherein the shear-stable polymers have shear stability indices below 15.

22. The method of claim 18 comprising one or more shear-stable polymers selected from the group consisting of:

polymethacrylate esters; polybutenes having a molecular weight less than 10,000; poly (1-decene) having a viscosity greater than 25 centistokes at 100° C.; styrene-butadiene copolymers; polyoxyalkylene glycol esters; and polyesters formed by reacting a dibasic carboxylic acid with a glycol.

23. The method of claim 22 wherein the one or more shear-stable polymers comprise at least 2.0 wt. % of the total weight.

24. The method of claim 9 wherein the hydraulic fluids are selected from:

(A) mineral oils;

(B) poly-α-olefins having the general formula

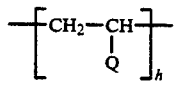

wherein h is about 3 to about 10 and Q is a $C_{4-10}$ alkyl;

(C) cycloaliphatics in which an aliphatic hydrocarbon is substituted by at least one cycloalkyl;

(D) alkylated aromatics having the general formula

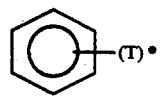

where T is a linear $C_{10-14}$ alkyl and e is >1;

(F) silicones having the formula

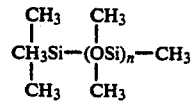

where n is >1;

(G) silicate esters having the formula

$(R^{16}O)_4Si$ where $R^{16}$ is $C_{1-30}$ alkyl or $C_{6-14}$ aryl or substituted aryl;

(H) polyglycols having the formula

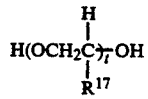

where $R^{17}$ is H or $C_{1-3}$ alkyl and t is >1 to about 50;

(I) phosphate esters having the formula

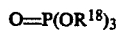

$O=P(OR^{18})_3$ where $R^{18}$ is independently a $C_{1-30}$ alkyl, $C_{6-22}$ aryl, or substituted aryl; and (J) organohalides other than esters of a halogen substituted aromatic acid in which a hydrocarbon or substituted hydrocarbon contains one or more of F, Cl, or Br.

25. The method of claim 24 further comprising the addition of one or more shear-stable polymers.

26. The method of claim 25 where the one or more shear-stable polymers comprise at least 2.0 wt % of the total weight.

* * * * *